US007602998B2

(12) United States Patent
Sato et al.

(10) Patent No.: US 7,602,998 B2
(45) Date of Patent: Oct. 13, 2009

(54) IMAGE SIGNAL PROCESSING APPARATUS

(75) Inventors: Shinichi Sato, Yokohama (JP);
Yoshikazu Naito, Yokohama (JP);
Hideyuki Shirai, Tokyo (JP)

(73) Assignee: Panasonic Corporation, Osaka (JP)

( * ) Notice: Subject to any disclaimer, the term of this patent is extended or adjusted under 35 U.S.C. 154(b) by 989 days.

(21) Appl. No.: 11/085,104

(22) Filed: Mar. 22, 2005

(65) Prior Publication Data

US 2006/0056739 A1 Mar. 16, 2006

(30) Foreign Application Priority Data

Sep. 15, 2004 (JP) ............................. 2004-269025

(51) Int. Cl.
*G06K 9/40* (2006.01)
(52) U.S. Cl. ....................... 382/302; 382/282; 382/284; 382/294
(58) Field of Classification Search ................. 382/302, 382/303, 307
See application file for complete search history.

(56) References Cited

U.S. PATENT DOCUMENTS

| 6,975,418 | B1 * | 12/2005 | Ohta et al. ................. 358/1.15 |
| 6,982,811 | B2 * | 1/2006 | Sato ............................ 358/1.4 |
| 7,287,253 | B2 * | 10/2007 | Yamamura et al. .......... 717/176 |
| 7,295,335 | B2 * | 11/2007 | Arakawa ................... 358/1.15 |
| 7,359,535 | B2 * | 4/2008 | Salla et al. .................. 382/128 |
| 2001/6263024 | | 7/2001 | Matsumoto |
| 2003/0012277 | A1 | 1/2003 | Azuma et al. |
| 2004/6681048 | | 1/2004 | Matsumoto |
| 2004/0076237 | A1 | 4/2004 | Kadono et al. |

FOREIGN PATENT DOCUMENTS

JP 8-123944 5/1996

OTHER PUBLICATIONS

English Language Abstract of JP 8-123944, May 1996.

* cited by examiner

*Primary Examiner*—Yosef Kassa
(74) *Attorney, Agent, or Firm*—Greenblum & Bernstein P.L.C.

(57) ABSTRACT

In order to allow an arbitrary combination of image processing function blocks and an arbitrary processing order to be executed with a single command and avoid calculation loads on a host CPU even when image processes in varying output image sizes are combined, the image signal processing apparatus of the present invention includes an individual processing sub program that operates image processes in page units or with an arbitrarily specified number of lines for each image processing function block and an individual processing parameter table that determines the individual processing contents and also provides a composite processing parameter table including image processing order information and image size related information and when an individual image processing command is issued, the image signal processing apparatus sets an individual processing parameter table in an image processing function block and executes the individual processing sub program.

11 Claims, 16 Drawing Sheets

COMPOSITE PROCESS PARAMETER EXAMPLES 1

| |
|---|
| Xin,Yin : INPUT IMAGE SIZE |
| FIRST IMAGE PROCESS |
| SECOND IMAGE PROCESS |
| THIRD IMAGE PROCESS |
| Mx,My : RESOLUTION CONVERSION SCALING FACTOR |
| Rt : ROTATION ANGLE |
| P1A : PAGE MEMORY 1 ADDRESS |
| P2A : PAGE MEMORY 2 ADDRESS |

FIG.10

COMPOSITE PROCESS PARAMETER EXAMPLES 2

| |
|---|
| Xin,Yin : INPUT IMAGE SIZE |
| FIRST IMAGE PROCESS |
| SECOND IMAGE PROCESS |
| THIRD IMAGE PROCESS |
| M1x,M1y : FIRST IMAGE PROCESS, RESOLUTION CONVERSION SCALING FACTOR |
| M2x,M2y : SECOND IMAGE PROCESS, RESOLUTION CONVERSION SCALING FACTOR |
| M3x,M3y : THIRD IMAGE PROCESS, RESOLUTION CONVERSION SCALING FACTOR |
| RI : FIRST IMAGE PROCESS, ROTATION ANGLE |
| R2 : SECOND IMAGE PROCESS, ROTATION ANGLE |
| R3 : THIRD IMAGE PROCESS, ROTATION ANGLE |
| P1A : PAGE MEMORY 1 ADDRESS |
| P2A : PAGE MEMORY 2 ADDRESS |

FIG.14

ROTATION PARAMETER

| |
|---|
| PROTXi,PROTYi : NUMBER OF INPUT PIXELS |
| Re : ROTATION ANGLE |
| PRTSA : SOURCE MEMORY ADDRESS |
| PRTDA : DESTINATION MEMORY ADDRESS |
| PROCESS RESULT INFORMATION (NORMAL END/ABNORMAL END) |

FIG.15

RESOLUTION CONVERSION PARAMETER

| PRCVXi, PRCVYi : NUMBER OF INPUT PIXELS |
|---|
| PRCV S : NUMBER OF BLOCK PROCESS LINES |
| Mex, Mey : RESOLUTION CONVERSION SCALING FACTOR |
| PRCSA : SOURCE MEMORY ADDRESS |
| PRCDA : DESTINATION MEMORY ADDRESS |
| PROCESS RESULT INFORMATION (NORMAL END/ABNORMAL END) |

FIG.16

JBIG ENCODING PARAMETER

| PCQMXi, PCQMYi : NUMBER OF INPUT PIXELS |
|---|
| PCQM S : NUMBER OF BLOCK PROCESS LINES |
| PCQSA : SOURCE MEMORY ADDRESS |
| PRQDA : DESTINATION MEMORY ADDRESS |
| PROCESS RESULT INFORMATION (NORMAL END/ABNORMAL END, CODE SIZE) |

FIG.17

IMAGE SIGNAL PROCESSING APPARATUS

BACKGROUND OF THE INVENTION

1. Field of the Invention

The present invention relates to an image signal processing apparatus having a plurality of image processing functions, and more particularly, to an image signal processing apparatus capable of successively executing a plurality of arbitrarily combined image processing functions through a single command.

2. Description of the Related Art

There is an image signal processing apparatus having a plurality of image processing function blocks, which achieves requested image processing by causing an external CPU to send a command specifying an operating mode to an internal CPU and the internal CPU to operate the respective image processing function blocks in the order specified by the command (see Unexamined Japanese Patent Publication No. 8-123944).

An image signal processing apparatus having a plurality of image processing function blocks and an individual processing parameter table which determines contents of individual operation for each image processing function block is known. Such an image signal processing apparatus generates a command issuance interrupt by causing a host CPU to write a command code to a command register.

Upon receipt of the command issuance interrupt, a micro program in a local control CPU analyzes the command code in the command register. Based on the analysis result, the local control CPU sets registers of the corresponding image processing function block based on the data of the corresponding image processing parameter table and writes the data in an input buffer memory from a host image bus through an external data input. Then, when data corresponding to a predetermined number of lines is stored in the input buffer memory, the micro program in the local control CPU starts an image processing program associated with the corresponding image processing function block. The image processing function block outputs the image processing result to an output buffer memory. When data corresponding to a predetermined number of lines is stored in the output buffer memory, the micro program outputs the data to the host image bus through a data external output.

To ensure that images are processed by the p program of the internal CPU in the image processing order specified by the command, the above described apparatus needs to describe all functions related to the settings of parameter registers in an external input/output block and image processing function block and the settings of a DMA controller which controls a data transfer between an SDRAM and the image processing function block, etc., in accordance with the advance of the image process. For that reason, when a single image processing function block is operated by a single command or even when a plurality of combined image processing function blocks is executed in a predetermined order, programming is easy if the processing order is fixed.

However, when an attempt is made to sequentially process an arbitrary combination of image processing function blocks and in an arbitrary processing order through a single command, programming is branched in a complicated manner. As the number of image processing function blocks increases, programming all their states involves an enormous amount of work and the amount of data of the μ program also becomes enormous.

When an attempt is made to sequentially process an arbitrary combination of image processing function blocks and in an arbitrary processing order, it may be possible to cause the host CPU to perform control by issuing commands in the image processing order sequentially, however when image processes in varying output image sizes such as rotation process and resolution variation are combined, parameters of the next-stage image processing function block change and a corresponding change to the image processing parameter table is required. As a result, the load on the host CPU increases.

A system which defines a command of a specific image processing order and provides a dedicated parameter table and micro program may be constructed, but as the number of image processing function blocks increases the combination becomes enormous and it is more difficult to provide the corresponding parameter table and micro program.

SUMMARY OF THE INVENTION

It is an object of the present invention to provide an image signal processing apparatus capable of executing an arbitrary combination of image processing function blocks and in an arbitrary processing order through a single command, without producing any calculation load on a host CPU even when image processes in varying output image sizes are combined.

The present invention includes an individual processing sub program which operates image processing in page units or with an arbitrarily specified number of lines for each image processing function block and an individual processing parameter table which determines the individual processing contents, also provides a composite processing parameter table including image processing order information and image size related information, sets the individual processing parameter table in the image processing function block when an individual image processing command is issued and executes the individual processing sub program. Furthermore, when a composite processing command is issued, the present invention references the image processing order information of the composite processing parameter table, sets the individual processing parameter table in the image processing function block in the order following the contents of the description and executes the individual processing sub program.

BRIEF DESCRIPTION OF THE DRAWINGS

FIG. 10 illustrates composite parameters according to this embodiment;

FIG. 14 illustrates examples of composite parameters according to this embodiment;

FIG. 15 illustrates examples of rotation parameters according to this embodiment;

FIG. 16 illustrates examples of resolution conversion parameters according to this embodiment;

FIG. 17 illustrates examples of JBIG encoding parameters according to this embodiment.

DETAILED DESCRIPTION OF THE PREFERRED EMBODIMENTS

Figure 1:
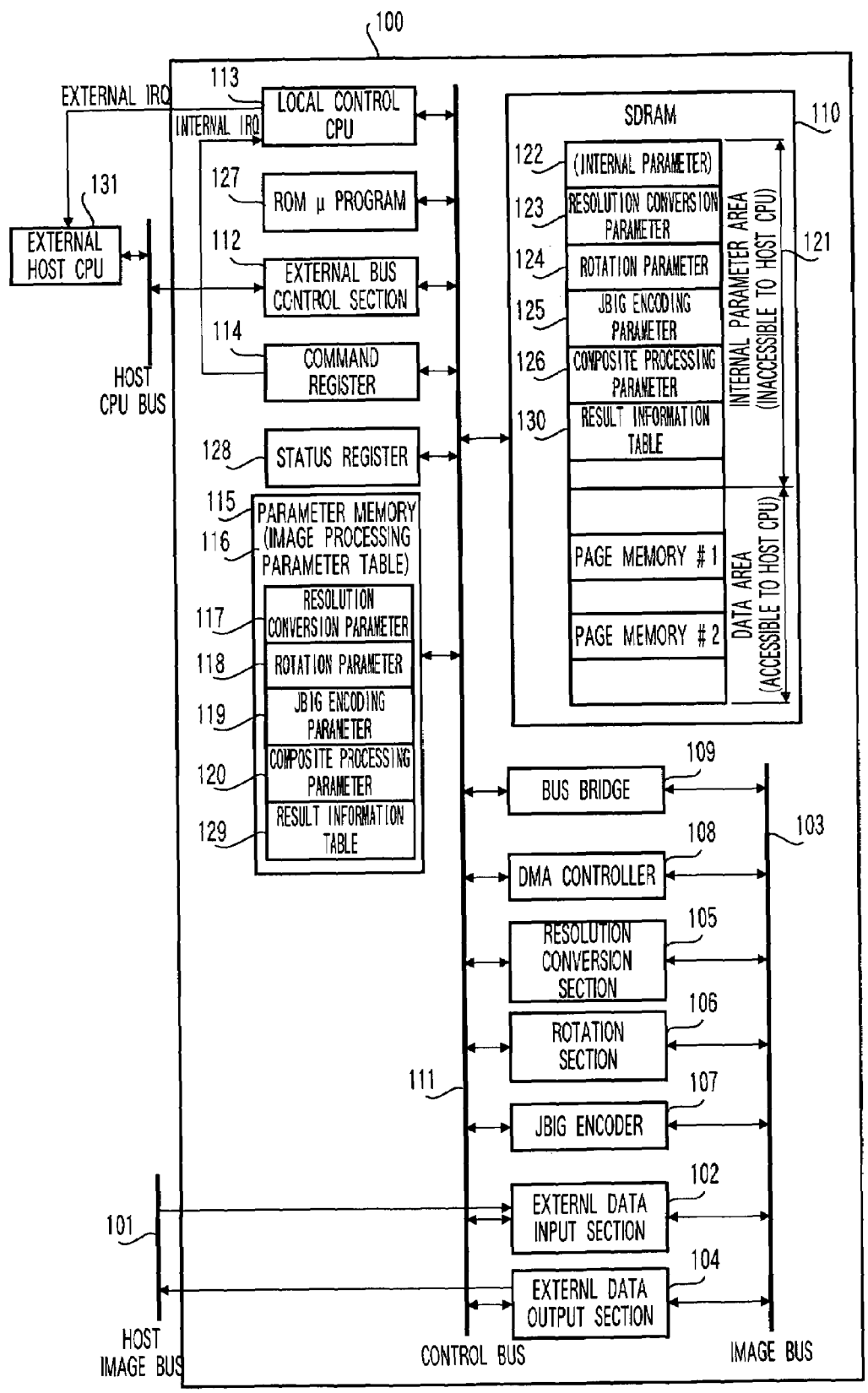
FIG. 1 is a block diagram showing the configuration of an image signal processing apparatus according to an embodiment of the present invention.

With reference now to the attached drawings, an image signal processing apparatus according to an embodiment of the present invention will be explained below. FIG. 1 is a block diagram showing the configuration of an image signal processing apparatus according to an embodiment of the present invention.

The image signal processing apparatus 100 inputs data from a host image bus 101 to an image bus 103 through an external data input section 102 and outputs data from the image bus 103 to the host image bus 101 through an external data output section 104.

The image signal processing apparatus 100 is provided with the external data input section 102, the external data output section 104 connected to the image bus 103, a resolution conversion section 105 that expands/compresses an image or converts resolution, a rotation section 106 that rotates an image by an angle selected from among 90 degrees, 180 degrees and 270 degrees and a JBIG encoder 107 that encodes an image to a JBIG code. The function blocks 105 to 107 perform a data input/output transfer to/from a page memory area on an SDRAM 110 by a DMA controller 108 likewise connected to the image bus 103 that controls data transfers through a bus bridge 109 and the individual functions thereof are set from a control bus 111.

An external host CPU 131 can access data areas of a command register 114, a parameter memory 115 and the SDRAM 110 on the control bus 111 through an external bus control section 112 that controls the control bus 111.

The external host CPU 131 sets an image processing parameter table 116 in the parameter memory 115 and when a command code is written in the command register 114, a command issuance interrupt is exerted on a local control CPU 113.

Furthermore, the image processing parameter table 116 is provided with a resolution conversion parameter 117 that controls the function of the resolution conversion section 105, a rotation parameter 118 that controls the function of the rotation section 106, a JBIG encoding parameter 119 that controls the function of the JBIG encoder section 107, a composite processing parameter 120 that controls the function of composite processing which combines a plurality of image processing functions and executes the processes sequentially and a result information table 129 that notifies the external host CPU 131 of the image processing result information. The above described tables 117 to 119 will be collectively called "individual processing parameter tables."

The local control CPU 113 operates according to a μ program stored in a ROM 127 and controls all the function blocks in the image signal processing apparatus 100 through the control bus 111.

Figure 2:
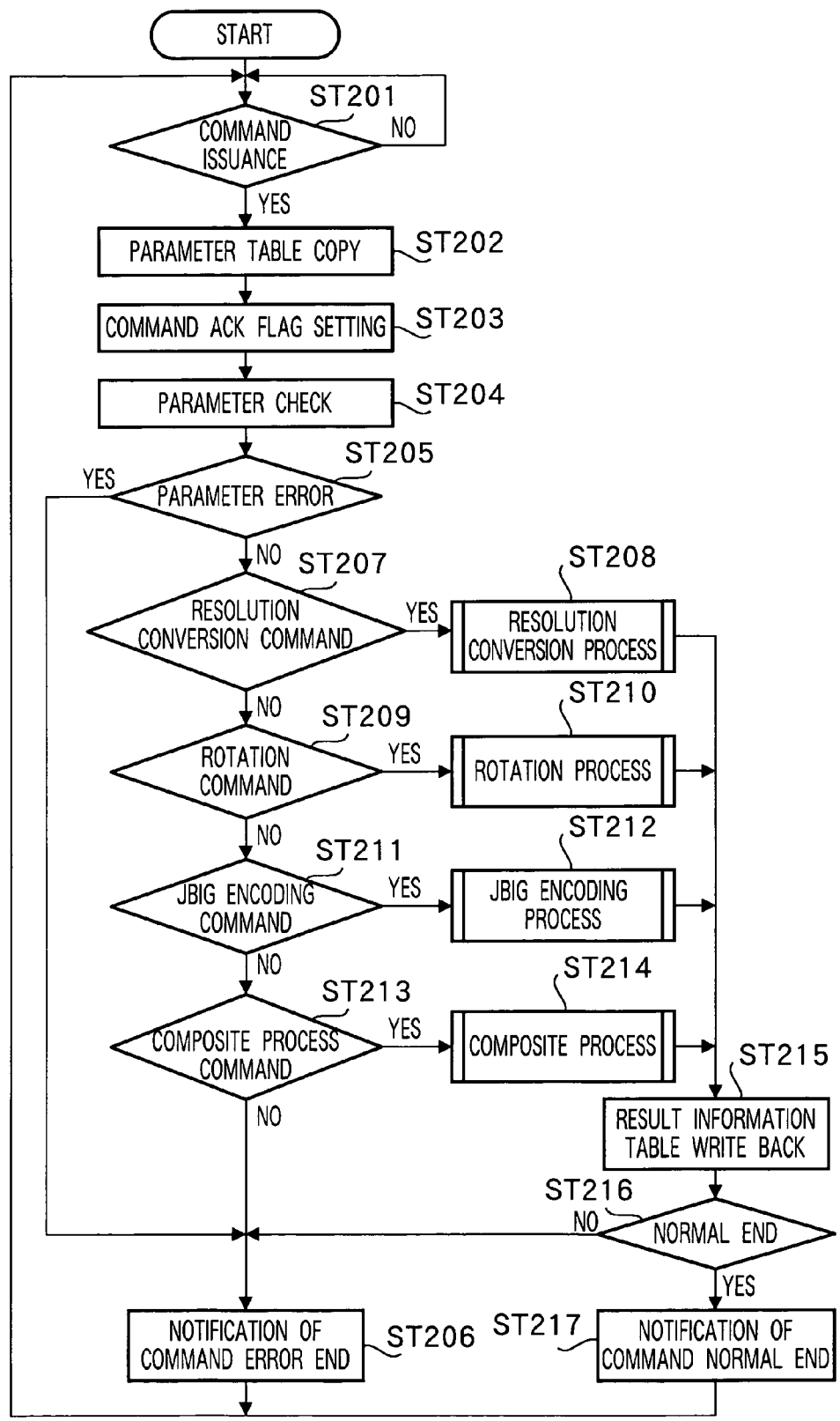
FIG. 2 is a flow chart showing the operation of the image signal processing apparatus according to this embodiment.

FIG. 2 is a flow chart showing the operation of the image signal processing apparatus according to this embodiment.

A command code is written from the external host CPU 131 to the command register 114 through the external bus control section 112. When the command code write causes a command to be issued (ST201), the local control CPU 113 copies the individual processing parameter tables 117 to 119 and decoding processing parameter table 120 on the parameter memory 115 to an internal parameter area 121 on the SDRAM 110 as an internal parameter table 122. At this time, the internal parameter area 121 on the SDRAM 110 is specified as an area inaccessible to the external host CPU 131 (ST202), then a command ACK flag in a status register 128 is set (ST203) and an interrupt is generated to the external host CPU 131.

This command ACK flag is a flag notifying the external host CPU 131 that the input command has been acknowledged and a set parameter is fetched into the image signal processing apparatus 100.

The functions of the parameter table copy (ST202) and command ACK flag setting (ST203) in FIG. 2 allow the external host CPU 131 to change the contents of the individual processing parameter tables and composite processing parameter table on condition that the command ACK flag is set after the issuance of a composite processing command without waiting for the command to end and it is thereby possible to shorten a total image processing time including the parameter setting time of the external host CPU 131.

Thus, after the command ACK flag is set, the external host CPU 131 can set parameters for the next image process without waiting for the image process to end, and therefore when a large-volume image processing parameter table needs to be rewritten, it is possible to shorten a total image processing time including the parameter setting time of the external host CPU 131.

Furthermore, in a system in which image processing parameters are copied through a parameter table copy (ST202) to the internal parameter table 122 which is inaccessible to the external host CPU 131 to carry out image processing, by writing back the result information table 130 of the internal parameter table 122 to the result information table 129 of the image processing parameter table 116 when the image process ends, it is possible to notify the external host CPU 131 of image processing result information such as the output data size, amount of output code data, occurrence of image processing errors, etc., when the command ends.

Furthermore, when the parameter table is copied (ST202), using part of the SDRAM 110 which is an image processing work memory makes it possible to construct an image signal processing apparatus which will not require any new memory for the internal parameter table.

Furthermore, when a parameter table is copied (ST202), copying the internal parameters to the area inaccessible to the external host CPU 131 on the SDRAM 110 prevents the internal parameters from being mistakenly rewritten due to wrong control by the external host CPU 131 or prevents composite processing from functioning abnormally when the external host CPU 131 directly accesses image data on the SDRAM 110, adds an additional image such as header/footer to the image data or rewrites the code data with the header information.

On the other hand, the local control CPU 113 carries out image processing with reference to only internal parameters on the SDRAM 110 and the internal parameters are not changed irrespective of the operation of the external host CPU 131 when execution of an image processing command is in progress, and therefore it is possible to reference parameter values at necessary timing in accordance with the progress of image processing.

Furthermore, in order to prohibit the external host CPU 131 from overwriting data with wrong parameters, the internal parameter area 121 prohibits the access by the external host CPU 131.

Next, the local control CPU 113 checks the contents of copied individual processing parameter tables 123 to 125 on the internal parameter table 122 and a composite processing parameter table 126 (ST204).

When the external host CPU 131 sets wrong addresses as destination address values of the individual processing parameters and page memory address values of the composite processing parameters, this parameter check (ST204) can prevent the internal parameters from being overwritten due to the data transfer and thereby prevent composite processing from failing to function normally.

Next, the local control CPU 113 checks whether destination memory addresses of image data in the individual processing parameter tables 123 to 125 and specified values of page memory addresses of the composite processing parameter table 126 are within the data area or not, and when they are not within the data area, the local control CPU 113 decides that there is a parameter error (ST205), notifies a command error end without executing image processing and terminates the image processing (ST206). This is because the internal parameter table may be overwritten in the process of image processing.

On the other hand, when there is no parameter error (ST205), the local control CPU 113 carries out image processing according to the command.

First, when the command code on the command register 114 is a resolution conversion command (ST207), the local control CPU 113 executes a resolution conversion processing sub program (ST208), executes a rotation processing sub program (ST210) when it is a rotation command (ST209), executes an JBIG encoding sub program (ST212) when it is a JBIG encoding command (ST211), and executes a composite processing sub program (ST214) when it is a composite processing command (ST213).

Then, when each process ends, the local control CPU 113 writes the contents of the result information table 130 on the SDRAM 110 in a result information table 129 on the parameter memory 115 (ST215).

Even if the image processing parameter table 116 accessed by the external host CPU 131 is separated from internal parameters referenced by the image processing program, this allows the external host CPU 131 to read result information of image processing when the image processing ends.

When each image process ends normally (ST216), the local control CPU 113 generates a command normal end interrupt to the external host CPU 131 (ST217) and when each image processing does not end normally, the local control CPU 113 generates a command error interrupt (ST206).

Figure 3:
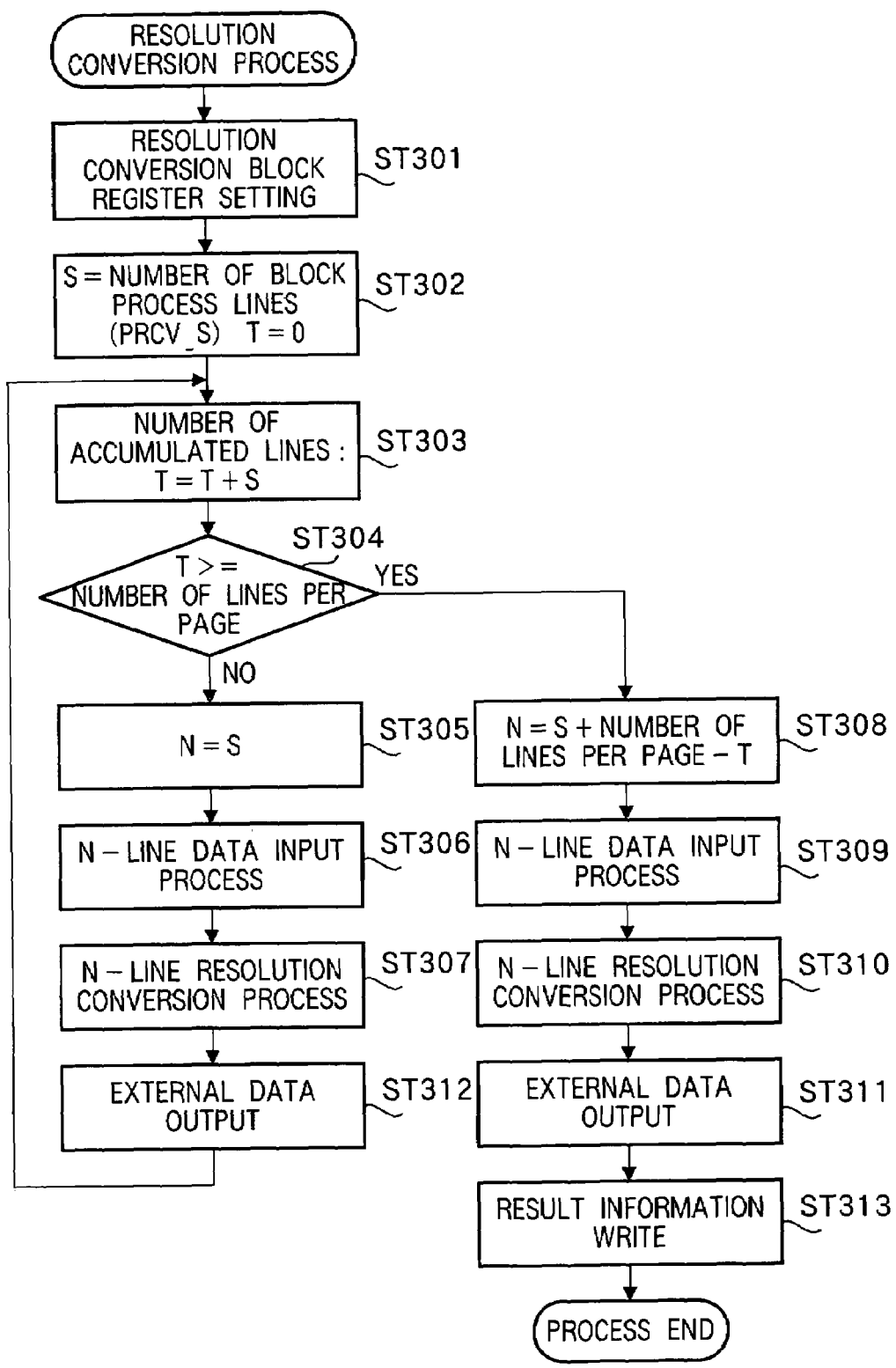
FIG. 3 is a flow chart showing the operation of a resolution conversion processing sub program according to this embodiment.

FIG. 3 is a flow chart showing the operation of a resolution conversion processing sub program (ST208).

The local control CPU 113 references the resolution conversion parameter 123 of the internal parameter table 122 and sets it in the internal register of the resolution conversion section 105 (ST301).

Next, the local control CPU 113 sets a predetermined number of lines S of resolution conversion, sets the number of accumulated lines T to an initial value 0 (ST302), calculates the number of accumulated lines T as T=T+S (ST303), and when the number of accumulated lines T is smaller than the number of lines per page (ST304), the local control CPU 113 sets N=S (ST305), inputs N-line data from the external data input section 102 to the SDRAM 110 through the image bus 103 and bus bridge 109, and the DMA controller 108 carries out a data transfer so that the address specified by the source memory address in the resolution conversion parameter 123 becomes the write start address at this time (ST306).

Next, the local control CPU 113 carries out an N-line resolution conversion process while performing data transfers sequentially from the source memory address of the SDRAM 110 to the resolution conversion section 105 through the DMA controller 108 and the converted images are written sequentially with the address on the SDRAM 110 as the write start address specified by the destination memory address in the resolution conversion parameter 123 (ST307).

Next, the resolution conversion output data written in the SDRAM 110 through the N-line resolution conversion process (ST307) is transferred to the external data output section 104 through the bus bridge 109 and image bus 103 by the DMA controller 108 and the data is output to the host image bus 101 (ST312).

Next, the local control CPU 113 returns to the calculation process of the number of accumulated lines T (ST303) and repeats the calculation until the number of accumulated lines T exceeds the number of lines per page.

On the other hand, when the number of accumulated lines T exceeds the number of lines per page in ST304, the local control CPU 113 calculates the predetermined number of lines N of resolution conversion as N=S+number of lines per page−T (ST308), inputs data of N lines (ST309) as in (ST306) above, carries out an N-line resolution conversion process (ST310) as in (ST307) above and outputs the resolution conversion output data to the outside (ST311) as in (ST312) above.

Then, the local control CPU 113 writes result information in the result information table 130 of the internal parameter 122 (ST313) and ends the process.

Figure 4:
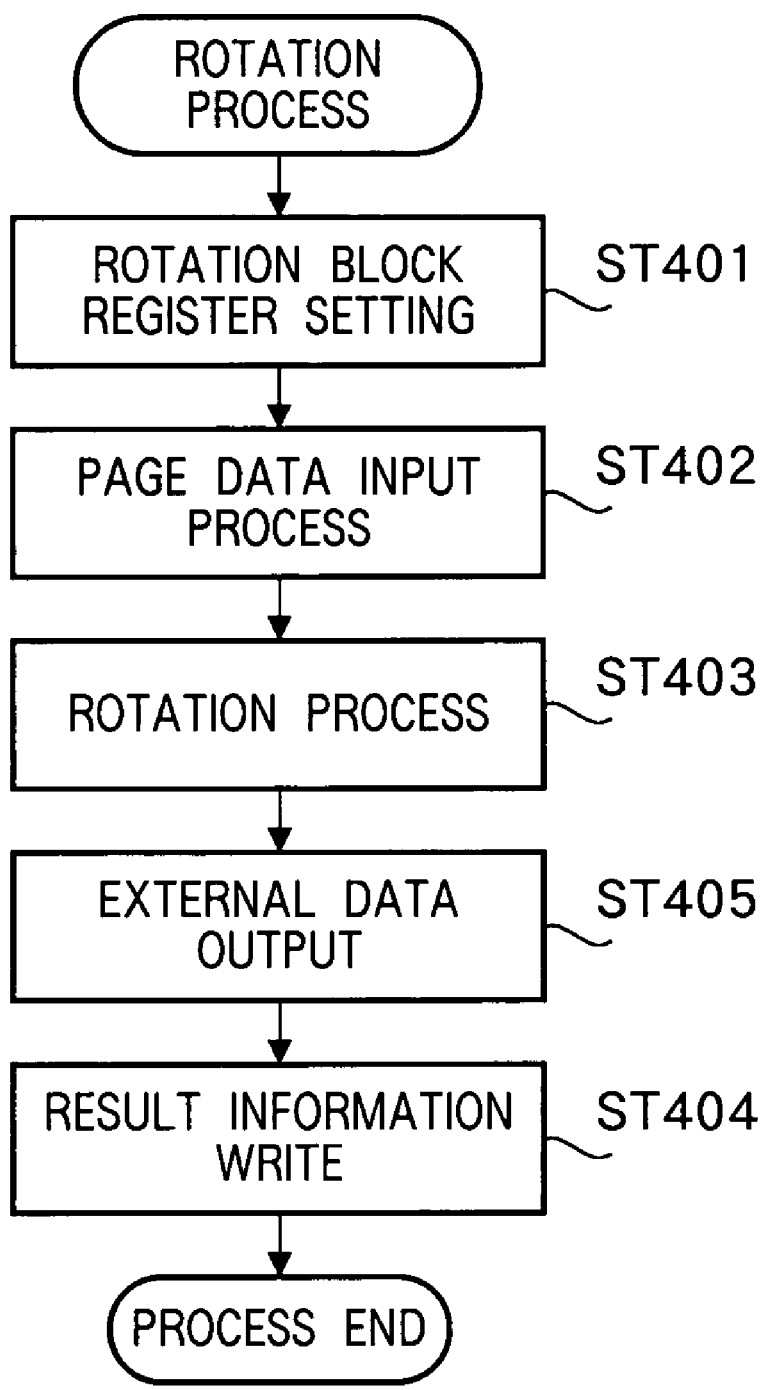
FIG. 4 is a flow chart showing the operation of a rotation processing sub program according to this embodiment.

FIG. 4 is a flow chart showing the operation of a rotation processing sub program (ST210).

The local control CPU 113 references the rotation parameter 124 of the internal parameter table 122 and sets them in the internal register of the rotation section 106 (ST401).

Next, the local control CPU 113 inputs 1-page data from the external data input section 102 to the SDRAM 110 through the image bus 103 and bus bridge 109 and the DMA controller 108 carries out a data transfer at this time so that the address specified by the source memory address in the rotation parameter 124 becomes the write start address (ST402).

Next, the local control CPU 113 carries out a 1-page rotation process while performing data transfers sequentially from the source memory address of the SDRAM 110 to the rotation section 106 through the DMA controller 108 and the rotated images are written sequentially with the address on the SDRAM 110 specified by the destination memory address in the rotation parameter 124 as the write start address (ST403).

Next, the local control CPU 113 transfers the rotation output data written on the SDRAM 110 through the 1-page rotation process (ST403) to the external data output section 104 through the bus bridge 109 and image bus 103 by the DMA controller 108 and outputs the data to the host image bus 101 (ST405).

Next, the local control CPU 113 writes the result information in a result information table 130 of the internal parameter 122 (ST404) and ends the write processing.

Figure 5:
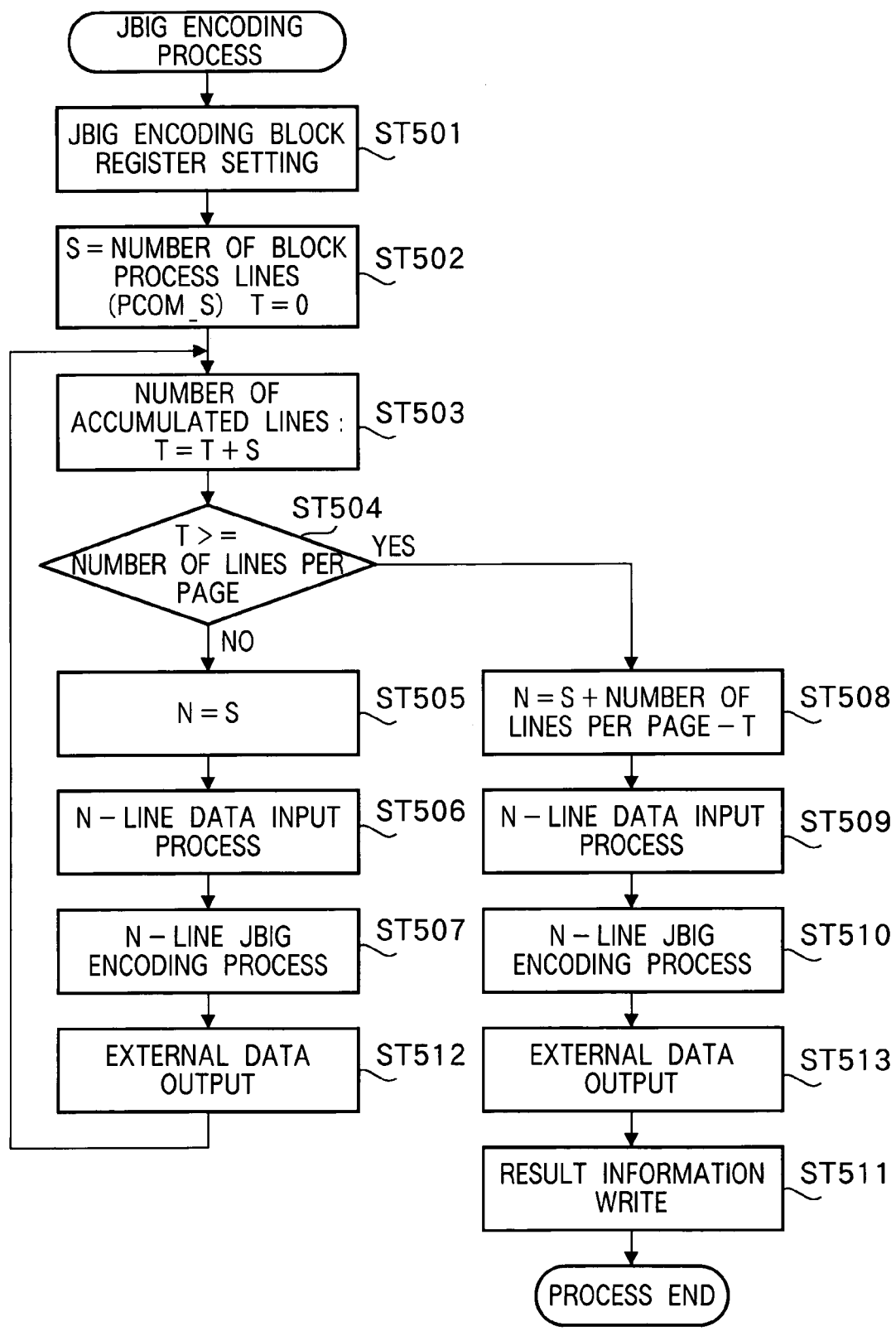
FIG. 5 is a flow chart showing the operation of a JBIG encoding processing sub program according to this embodiment.

FIG. 5 is a flow chart showing the operation of the JBIG encoding processing sub program (ST212).

The local control CPU 113 references the JBIG encoding parameter 125 of the internal parameter table 122 and sets them in the internal register of the JBIG encoder 107 (ST501).

Next, the local control CPU 113 sets a predetermined number of lines S of JBIG encoding, sets a number of accumulated lines T to an initial value 0 (ST502), calculates the number of accumulated lines T as T=T+S (ST503), and when the number of accumulated lines T is smaller than the number of lines per page (ST504), it sets N=S (ST505) and carries out an input process on N-line data from the external data input section 102 to the SDRAM 110 through the image bus 103 and bus bridge 109, and the DMA controller 108 carries out a data transfer so that the address specified by the source memory address in the JBIG encoding parameter 125 becomes the write start address at this time (ST506).

Next, the local control CPU 113 carries out an N-line JBIG encoding process while performing data transfers sequentially from the source memory address of the SDRAM 110 to the JBIG encoder 107 through the DMA controller 108. The converted code data is sequentially written with the address on the SDRAM 110 specified by the destination memory address in the JBIG encoding parameter 125 as the write start address (ST507).

Next, the local control CPU 113 causes the DMA controller 108 to carry out a data transfer of code data written on the SDRAM 110 through the N-line JBIG encoding process (ST507) to the external data output section 104 through the bus bridge 109 and image bus 103 and outputs the data to the host image bus 101 (ST512).

Next, the local control CPU 113 returns to the calculation process of the number of accumulated lines T (ST503) and repeats the calculation until the number of accumulated lines T exceeds the number of lines per page.

When the number of accumulated lines T exceeds the number of lines per page, the local control CPU 113 calculates the predetermined number of lines N of JBIG encoding as N=S+number of lines per page−T (ST508), carries out an N-line data input process (ST509) as in (ST506) above, carries out an N-line JBIG encoding process (ST510) as in (ST507) above and outputs the resolution conversion output data to the outside (ST513) as in (ST512) above.

The local control CPU 113 writes the result information in the result information table 130 of the internal parameter 122 (ST511) and ends the process.

Figure 6:
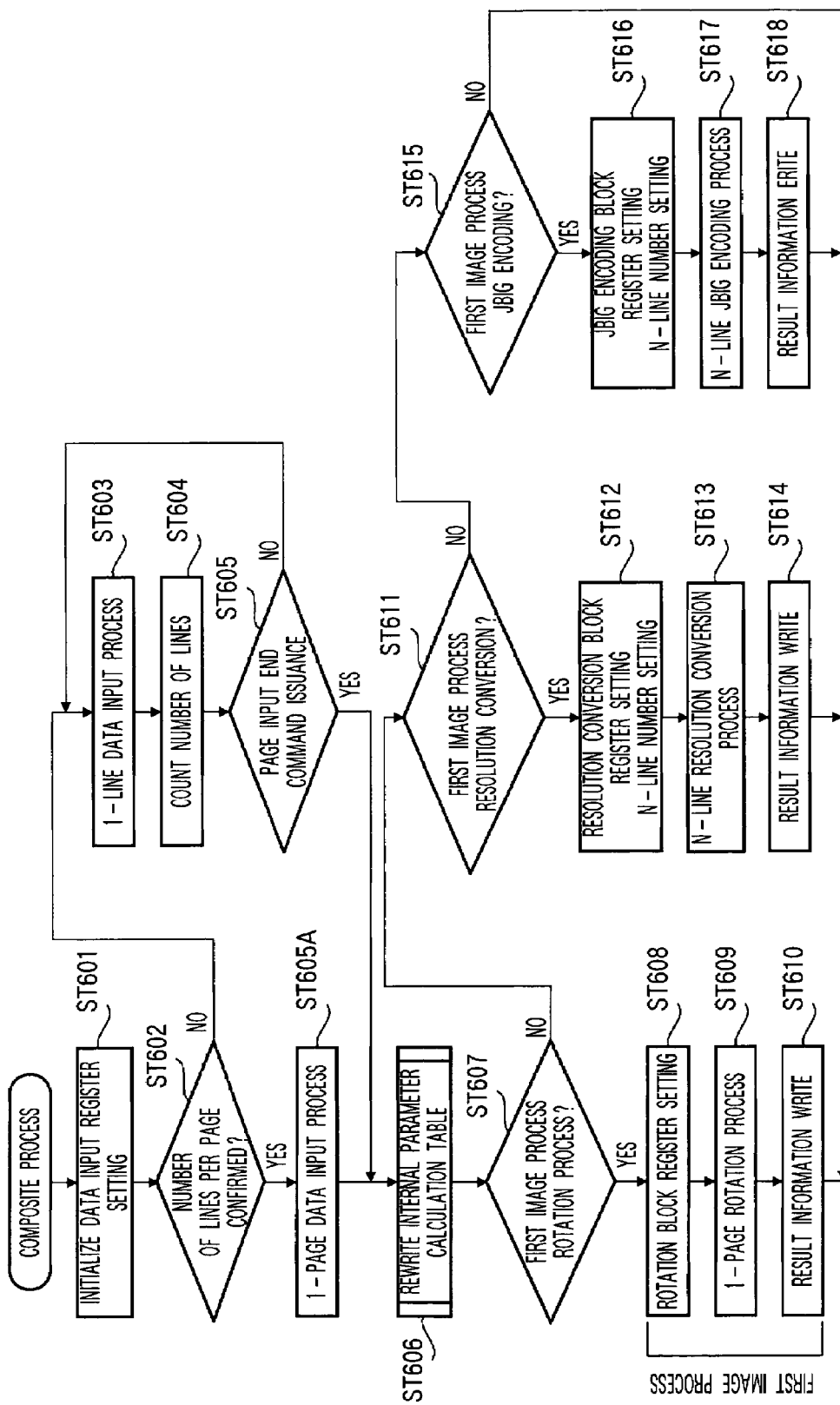
FIG. 6 is a first flow chart showing the operation of a first embodiment of a composite processing subprogram according to this embodiment.
Figure 7:
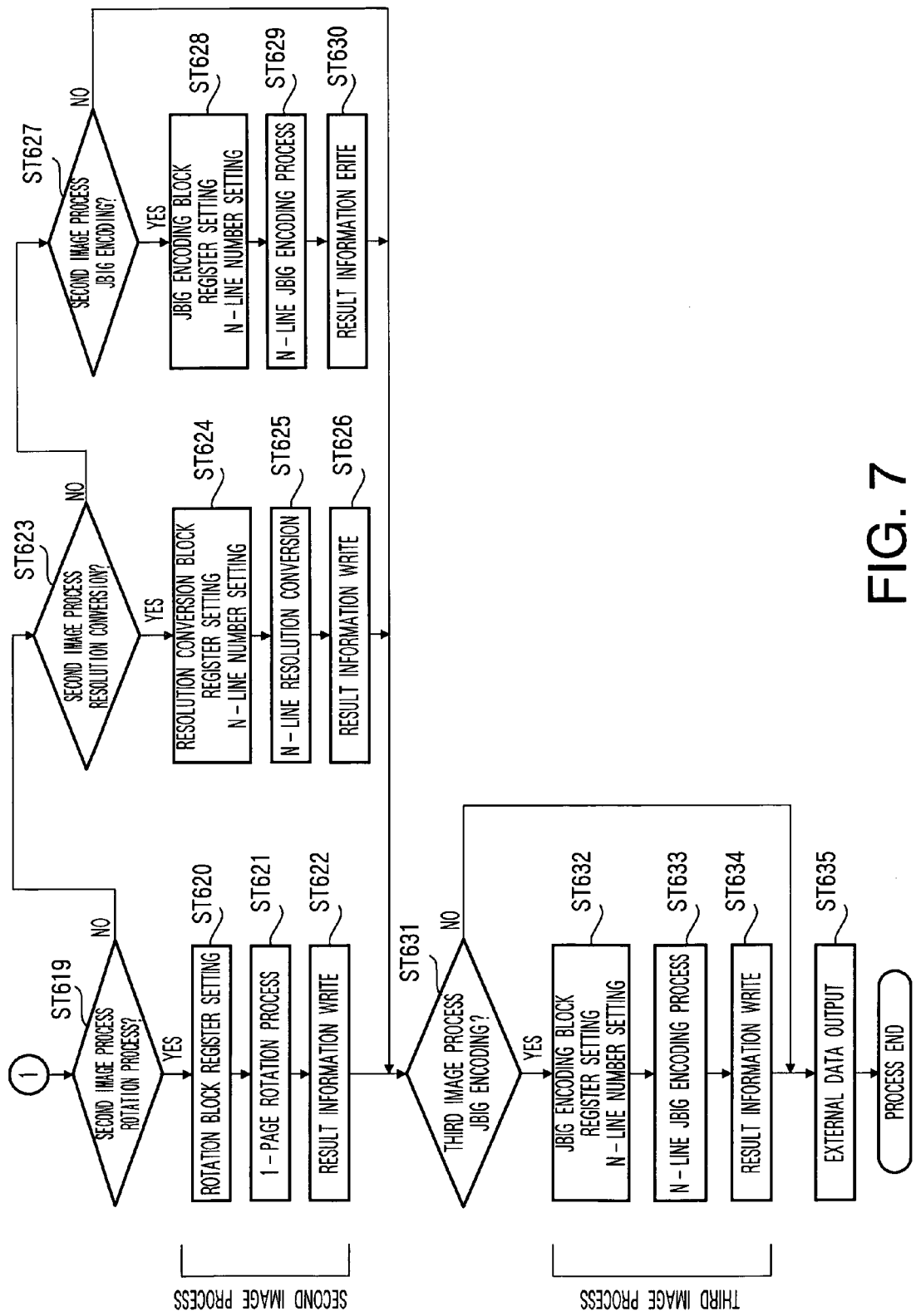
FIG. 7 is a second flow chart showing the operation of the first embodiment of the composite processing sub program according to this embodiment.

FIG. 6 and FIG. 7 are flow charts showing the operation of the composite processing sub program (ST214).

The composite processing explained here is operated on condition that selecting the same image process two or more times is prohibited.

The local control CPU 113 allows data to be transferred from the external data input section 102 to the SDRAM 110 through the image bus 103 and bus bridge 109 and sets the DMA controller 108 so that the address specified by the page memory 1 address in the composite processing parameter 126 becomes the write start address (ST601).

Next, the local control CPU 113 references the bit indicating whether the number of lines per page in the composite processing parameter 126 has already been confirmed or not, and if the number of lines per page is not confirmed (ST602), the local control CPU 113 transfers the 1-line data from the external data input section 102 to the SDRAM 110 through the image bus 103 and bus bridge 109 (ST603), and a page input end command code is written from the external host CPU 131 to the command register 114, this writing is repeated until a page input end command is issued (ST605) and the line count value when the page input end command is issued is regarded as the number of lines per page (ST604).

Even if the number of lines per page is not confirmed, the function of the page input end command (ST605) allows the external host CPU 131 to input image data before the number of lines is confirmed, making it possible to shorten the image processing time including the data input processing time.

On the other hand, when the number of lines per page is confirmed in ST602, the local control CPU 113 references the input image size in the composite processing parameter 126, transfers data corresponding to 1 page according to the number of lines from the external data input section 102 to the SDRAM 110 through the image bus 103 and bus bridge 109 and inputs the data (ST605A).

Next, the local control CPU 113 executes an internal parameter calculation and table rewriting sub program (ST606). Details of the process in ST606 will be explained later.

Next, the local control CPU 113 references the composite processing order of the internal parameter table 122 and when the first image process is rotation (ST607), the local control CPU 113 references the rotation parameter 124 of the internal parameter table 122 and sets an internal register of the rotation section 106 (ST608). Next, the local control CPU 113 carries out the same process as the rotation process (ST403) in the rotation conversion processing sub program (ST210), carries out a 1-page rotation process (ST609) and writes the result information in the result information table 130 of the internal parameter 122 (ST610).

On the other hand, when the first image process is resolution conversion (ST611), the local control CPU 113 references the resolution conversion parameter 123 of the internal parameter table 122, sets an internal register of the resolution conversion section, sets the number of lines per page as the number of resolution conversion lines N (ST612) and executes the same process as N-line resolution conversion process (ST310) in the resolution conversion processing sub program (ST208) (ST613). Then, the local control CPU 113 writes the result information in the result information table 130 of the internal parameter 122 (ST614).

On the other hand, when the first image process is JBIG encoding process (ST615), the local control CPU 113 references the JBIG encoding parameter 125 of the internal parameter table 122, sets an internal register of the JBIG encoder 107, sets the number of lines per page as the number of JBIG encoding lines N (ST616) and carries out the same process as the N-line JBIG encoding process (ST507) in the JBIG encoding processing sub program (ST212) (ST617). Then, the local control CPU 113 writes the result information in the result information table 130 of the internal parameter 122 (ST618).

Next, when the second image process is rotation (ST619), the local control CPU 113 references the rotation parameter 124 of the internal parameter table 122, sets the rotation block register (ST620), then executes a 1-page rotation process (ST621). Then, the local control CPU 113 writes the result information in the result information table 130 of the internal parameter 122 (ST622).

Furthermore, when the second image process is resolution conversion (ST623), the local control CPU 113 references the resolution conversion parameter 123 of the internal parameter table 122, sets and initializes the register of the resolution conversion block, sets the number of lines per page as the number of resolution conversion lines N (ST624) and executes an N-line resolution conversion process (ST625). Then, the local control CPU 113 writes the result information in the result information table 130 of the internal parameter 122 (ST626).

Furthermore, when the second image process is JBIG encoding process (ST627), the local control CPU 113 references the JBIG encoding parameter 125 of the internal parameter table 122, sets the JBIG encoding block register, sets the number of lines per page as the number of JBIG encoding lines N (ST628) and executes an N-line JBIG encoding process (ST629). Then, the local control CPU 113 writes the result information in the result information table 130 of the internal parameter 122 (ST630)

Next, when the third image process is JBIG encoding process (ST631), the local control CPU 113 references the JBIG encoding parameter 125 of the internal parameter table 122, sets the JBIG encoding block register, sets the number of lines per page as the number of JBIG encoding lines N (ST632), executes an N-line JBIG encoding process (ST633) and writes the result information in the result information table 130 of the internal parameter 122 (ST634) Next, the local control CPU 113 causes the DMA controller 108 to carry out a data transfer of the composite processing output data written in the page memory 2 on the SDRAM 110 to the external data output section 104 through the bus bridge 109 and image bus 103 through the above described composite processing and outputs the data to the host image bus 101 (ST635).

Thus, using the composite processing parameters allows the individual image processing sub program to operate according to a composite processing control procedure, makes it possible to process a plurality of specified images in an arbitrary combination and in an arbitrary order successively and even when images in varying output image sizes are combined, it is possible to process images with a single command without the need for intervention of the external host CPU 131 in midstream.

Furthermore, when JBIG encoding is selected in the above described first image process as a restriction on the composite processing order of the internal parameter table 122, output data becomes codes, and therefore there is no specifiable process in the second and third image processes and the settings of the second and third image processes are prohibited. For the same reason, when JBIG encoding is selected in the second image process, the specification of the third image process is prohibited. Furthermore, selecting the same image process two or more times is prohibited.

There are no execution conditions for rotation and resolution conversion in the above described third image process because such setting conditions do not occur as the prohibition conditions of the internal parameter table 122.

Figure 8:
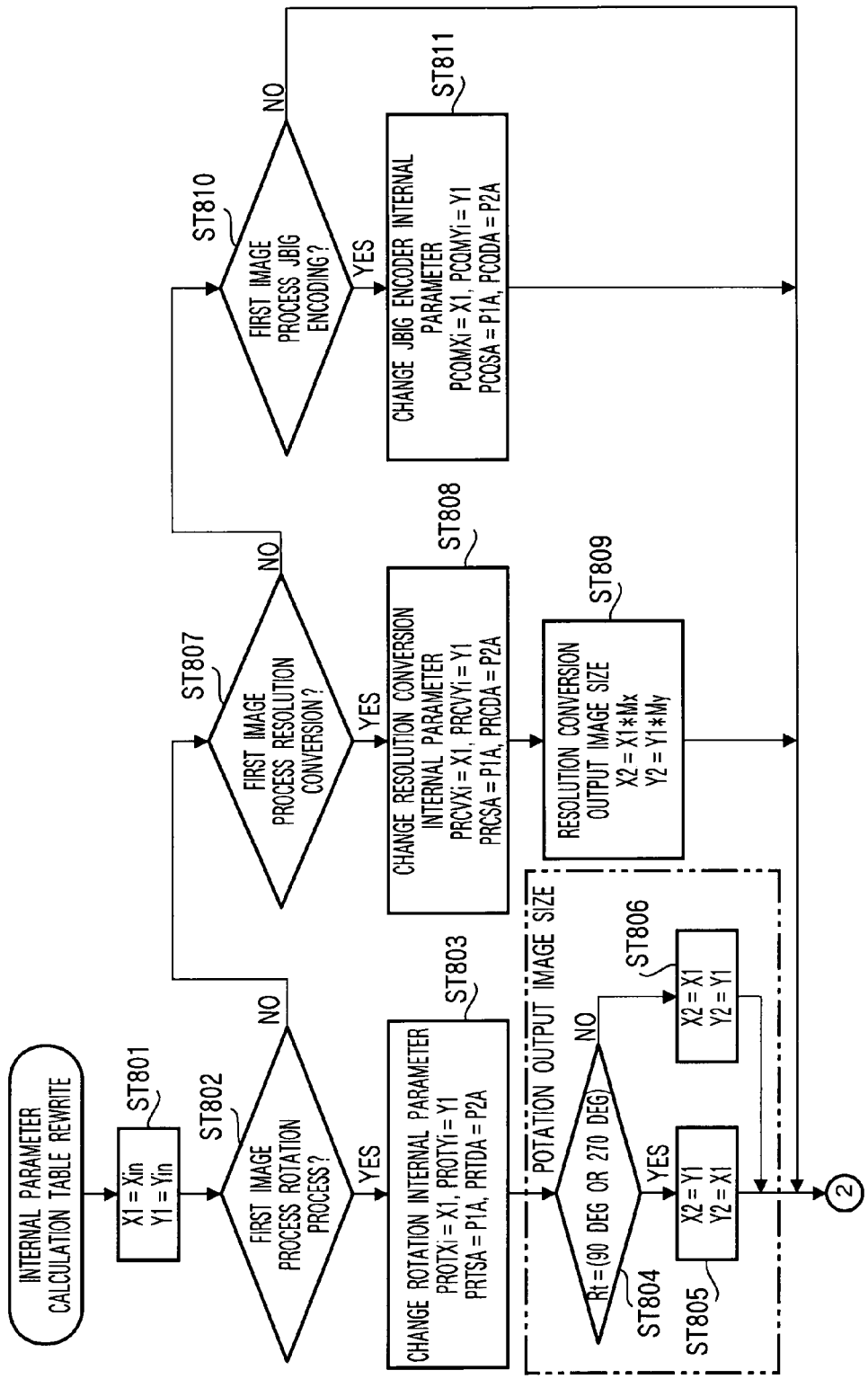
FIG. 8 is a first flow chart showing the operation of an internal parameter calculation and table rewriting sub program according to this embodiment.
Figure 9:
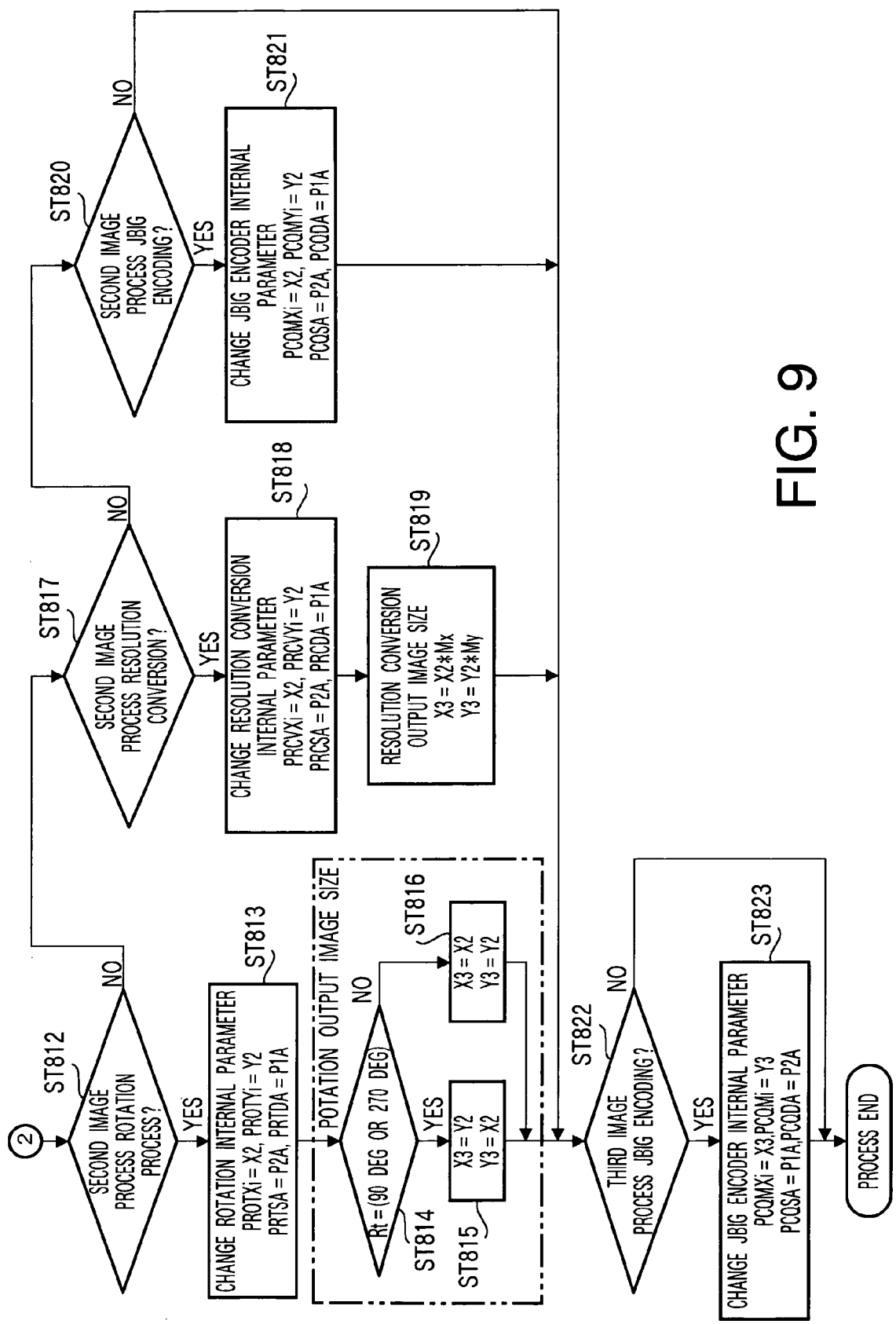
FIG. 9 is a second flow chart showing the operation of the internal parameter calculation and table rewriting sub program according to this embodiment.

FIG. 8 and FIG. 9 are flow charts showing the operation of the internal parameter calculation and table rewriting sub program (ST606). This process is started by the composite processing sub program.

At the time of a copy of the parameter table in FIG. 2 (ST202), the composite processing parameter 126 is given as shown in FIG. 10, an input image size (Xin, Yin), the contents of the first image process, second image process and third image process as the processing order information of the image processing function blocks, resolution conversion scaling factor (Mx, My) as image size control information, and rotation angle information (Rt), page memory 1 address (P1A) and page memory 2 address (P2A) as the memory control information.

The local control CPU 113 uses the number of input pixels (X1, Y1) of the first process as the input image size (Xin, Yin) (ST801), and when the first process is rotation (ST802), the local control CPU 113 changes the input image size (number of pixels) (PROTXi, PROTYi) shown in FIG. 15 to the number of input pixels (X1, Y1) of the first process as the contents of the rotation parameter 124 and changes the source memory address (PRTSA) likewise shown in FIG. 15 to the page memory 1 address (P1A) and changes the destination memory address (PRTDA) to the page memory 2 address (P2A) (ST803).

Next, when the rotation angle information (Rt) is rotation of 90 degrees or 270 degrees (ST804), the local control CPU 113 switches round vertical/horizontal size information of the number of input pixels (X2, Y2) of the second process and the number of input pixels (X1, Y1) of the first process as X2=Y1, Y2=X1 (ST805) or sets X2=X1, Y2=Y1 otherwise (ST806).

Furthermore, when the first image process is resolution conversion (ST807), the local control CPU 113 changes the number of input pixels (PRCVXi, PRCVYi) shown in FIG. 16 to the number of input pixels (X1, Y1) of the first process as the contents of the resolution conversion parameter 124 and changes the source memory address (PRCSA) likewise shown in FIG. 16 to the page memory 1 address (P1A) and changes the destination memory address (PRCDA) to the page memory 2 address (P2A) (ST808).

Next, using the resolution conversion scaling factor (Mx, My), the local control CPU 113 obtains the number of input pixels (X2, Y2) of the second process by multiplying the number of input pixels (X1, Y1) of the first process by the resolution conversion scaling factor (Mx, My) as X2=X1*Mx, Y2=Y1*My (ST809).

Furthermore, when the first image process is JBIG encoding (ST810), the local control CPU 113 changes the number of input pixels (PCQMXi, PCQMYi) shown in FIG. 17 to the number of input pixels (X1, Y1) of the first process as the contents of the JBIG encoding parameter 125 and changes the source memory address (PCQSA) likewise shown in FIG. 17 to the page memory 1 address (P1A) and changes the destination memory address (PCQDA) to the page memory 2 address (P2A) (ST811).

Next, when the second image process is rotation (ST812), the local control CPU 113 changes the rotation input image size (number of pixels) (PROTXi, PROTYi) shown in FIG. 15 to the number of input pixels (X2, Y2) of the second process as the contents of the rotation parameter 124, changes the source memory address (PRTSA) likewise shown in FIG. 15 to the page memory 2 address (P2A) and also changes the destination memory address (PRTDA) to the page memory 1 address (P1A) (ST813).

Next, when the rotation angle information (Rt) is rotation by 90 degrees or 270 degrees (ST814), the local control CPU 113 obtains the number of input pixels (X3, Y3) of the third process by switching round the vertical/horizontal size information of the number of input pixels (X2, Y2) of the second process as X3=Y2, Y3=X2 (ST815) or sets X3=X2, Y3=Y2 otherwise (ST816).

Furthermore, when the second image process is resolution conversion (ST817), the local control CPU 113 changes the number of input pixels (PRCVXi, PRCVYi) shown in FIG. 16 to the number of input pixels (X2, Y2) of the second process as the contents of the resolution conversion parameter 124 and changes the source memory address (PRCSA) likewise shown in FIG. 16 to the page memory 2 address (P2A) and also changes the destination memory address (PRCDA) to the page memory 1 address (P1A) (ST818) Next, using the resolution conversion scaling factor (Mx, My), the local control CPU 113 obtains the number of input pixels (X3, Y3) of the third process by multiplying the number of input pixels (X2, Y2) of the second process by the resolution conversion scaling factor (Mx, My) as X3=X2*Mx, Y3=Y2*My (ST819).

Furthermore, when the second image process is JBIG encoding (ST820), the local control CPU 113 changes the number of input pixels (PCQMXi, PCQMYi) shown in FIG. 17 to the number of input pixels (X2, Y2) of the second process as the contents of the JBIG encoding parameter 125, changes the source memory address (PCQSA) likewise shown in FIG. 17 to the page memory 2 address (P2A) and also changes the destination memory address (PCQDA) to the page memory 1 address (P1A) (ST821).

Next, when the third image process is JBIG encoding (ST822), the local control CPU 113 changes the number of input pixels (PCQMXi, PCQMYi) shown in FIG. 17 to the number of input pixels (X3, Y3) of the third process as the contents of the JBIG encoding parameter 125, changes the source memory address (PCQSA) likewise shown in FIG. 17 to the page memory 1 address (P1A) and also changes the destination memory address (PCQDA) to the page memory 2 address (P2A) and ends the process (ST822).

In this way, by calculating and changing the individual processing parameter table information copied to the internal parameter table from the processing order information of the image processing function blocks and the control information for changing the output image size such as a variable scaling factor and rotation angle as the input image size and image size control information, it is possible to process images with a single command without any intervention of the external host CPU 131 in midstream even when images in varying output image sizes are combined.

That is, even when the output image size changes depending on the contents of image processing parameters such as expansion/compression, rotation through the internal parameter calculation and table rewriting sub program process (ST606), the external host CPU 131 can complete the process with only the setting of a single command and thereby shorten the processing time of the external host CPU 131.

Furthermore, the first image process specifies the source address as the page memory 1 (P1A) and the destination memory address as the page memory 2 (P2A) the second image process specifies the source address as the page memory 2 (P2A) and the destination memory address as the page memory 1 (P1A), and the third image process specifies the source address as the page memory 1 (P1A) and the destination memory address as the page memory 2 (P2A), and by processing images while allowing the images to move to and fro across two page memory areas, it is possible to process images within a page memory with two pages specified by the decoding processing parameter even if the number of times the composite processing is executed increases irrespective of the image processing contents and thereby effectively use the memory space.

Figure 11:
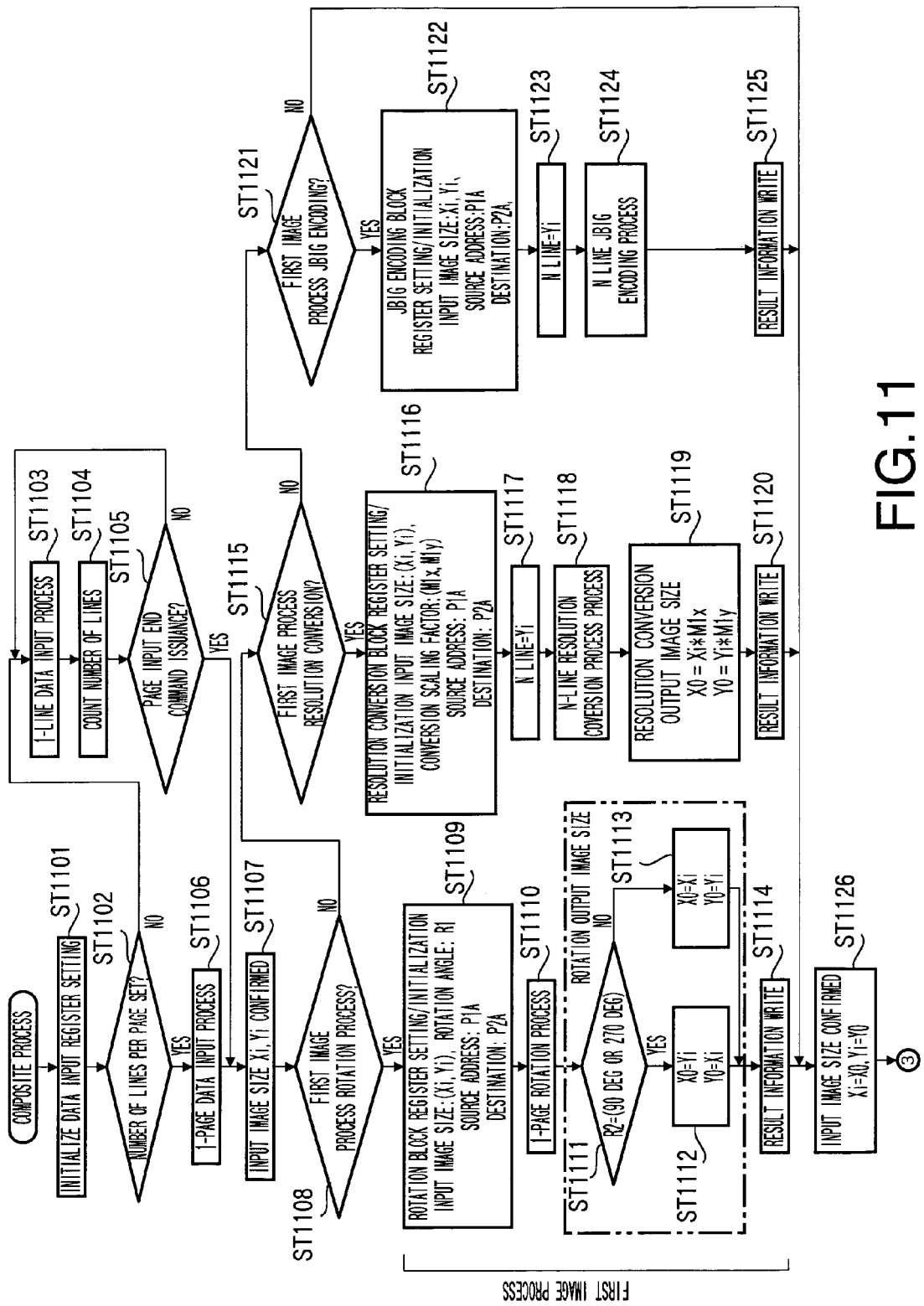
FIG. 11 is a first flow chart showing the operation of a second embodiment of a composite processing sub program according to this embodiment.
Figure 12:
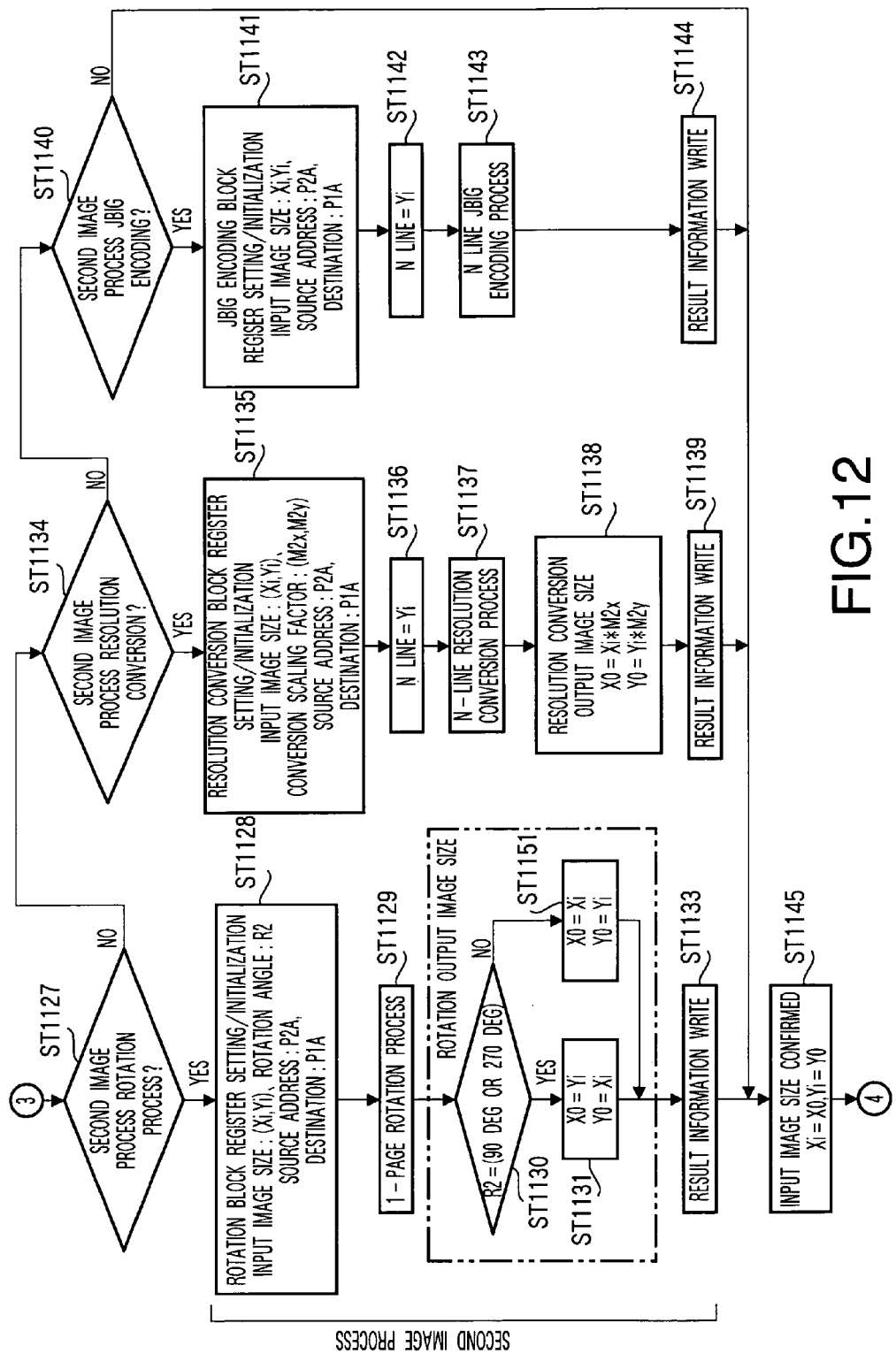
FIG. 12 is a second flow chart showing the operation of the second embodiment of the composite processing sub program according to this embodiment.
Figure 13:
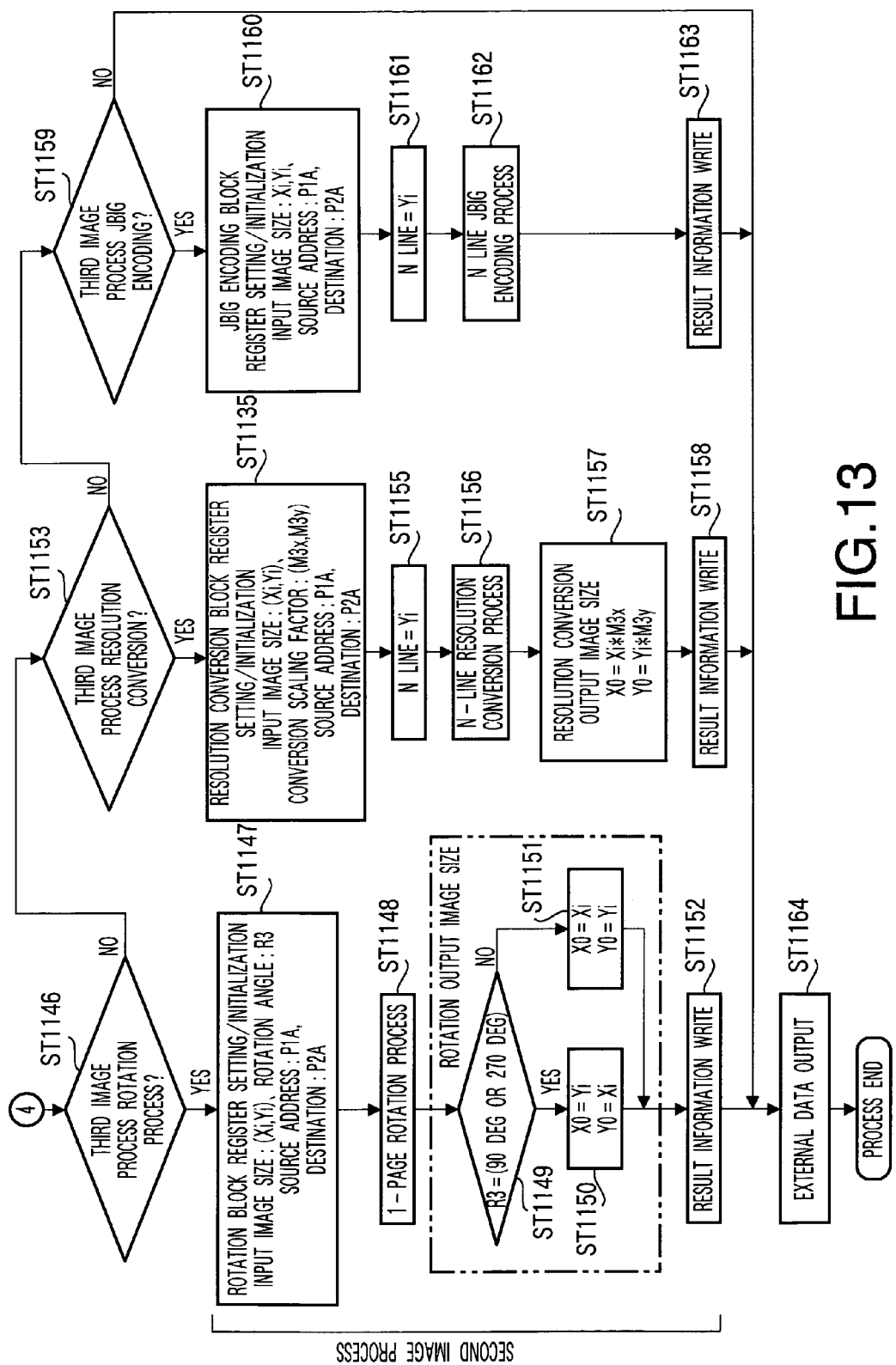
FIG. 13 is a third flow chart showing the operation of the second embodiment of the composite processing sub program according to this embodiment.

FIG. 11 to FIG. 13 are flow charts showing the operation of a second embodiment of the composite processing sub program (ST214). This composite processing allows the same image process to be operated a plurality of times.

At the time of the parameter table copy (ST202) in FIG. 2, the composite processing parameter 126 is given, as shown in FIG. 14, an input image size (Xin, Yin), the contents of the first image process, second image process and third image process as the processing order information of the image processing function blocks, and a resolution conversion scaling factor (M1x, M1y) and rotation angle information (R1) of the first image process, resolution conversion scaling factor (M2x, M2y) and rotation angle information (R2) of the second image process, resolution conversion scaling factor (M3x, M3y) and rotation angle information (R3) of the third image process as the image size control information, and page memory 1 address (P1A), page memory 2 address (P2A) as the memory control information.

The local control CPU 113 is then allowed to transfer data from the external data input section 102 to the SDRAM 110 through the image bus 103 and bus bridge 109 and sets the DMA controller 108 so that the address specified by the page memory 1 address of the composite processing parameter 126 becomes the write start address (ST1101).

Next, the local control CPU 113 references the bit indicating whether the number of lines per page in the composite processing parameter 126 has been confirmed or not, and if the number of lines per page has not been confirmed (ST1102), the local control CPU 113 transfers 1-line data from the external data input section 102 to the SDRAM 110 through the image bus 103 and bus bridge 109 (ST1103), writes a page input end command code from the external host CPU 131 to the command register 114 and repeats the writing until a page input end command is issued (ST1105) and regards the line count value at the time of issuance of the page input end command as the number of lines per page (ST1104).

Even if the number of lines per page is not confirmed, the function of the page input end command (ST1105) allows the external host CPU 131 to input image data without waiting until the number of lines is confirmed, making it possible to shorten the image processing time including the data input processing time.

On the other hand, when the number of lines per page is confirmed in ST1102, the local control CPU 113 references the input image size in the composite processing parameter 126, transfers data corresponding to 1 page from the external data input section 102 to the SDRAM 110 through the image bus 103 and bus bridge 109 according to the number of lines (ST1106).

At this time, the local control CPU 113 confirms the input image size (Xi, Yi) of the image process (ST1107).

Next, the local control CPU 113 references the first image process, second image process and third image process shown in FIG. 14 as the contents of the composite processing parameter 126, and when the first image process is rotation (ST1108), the local control CPU 113 sets rotation parameter 124 of the internal parameter table 122 in the internal register of the rotation section 106, then resets the rotation angle information (R1) of the first image process in the rotation angle register which is the internal register of the rotation section 106; likewise the input image size (Xi, Yi) in the input image size register; likewise the page memory 1 address (P1A) in the source address register; likewise the page memory 2 address (P2A) in the destination memory address register (ST1109).

Next, the local control CPU 113 executes 1-page rotation processing (ST1110).

Next, when the rotation angle information of the first image process is 90 degrees or 270 degrees (ST1111) the local control CPU 113 obtains the output image size (Xo, Yo) by switching round the vertical/horizontal size information having an input of an image size (Xi, Yi) as Xo=Yi, Yo=Xi (ST1112) or sets Xo=Xi, Yo=Yi otherwise (ST1113) Next, the local control CPU 113 writes the result information in the result information table 130 of the internal parameter 122 (ST1114).

Furthermore, when the first image process is resolution conversion (ST1115), the local control CPU 113 sets the resolution conversion parameter 123 of the internal parameter table 122 in the internal register of the resolution conversion section 105, then resets a resolution conversion scaling factor (M1$x$, M1$y$) from the resolution conversion scaling factor information of the first image process in the conversion scaling factor register which is the internal register of the resolution conversion section 105; likewise the input image size (Xi, Yi) in the input image size register; likewise the page memory 1 address (P1A) in the source address register; likewise the page memory 2 address (P2A) in the destination memory address register (ST1116).

Next, the local control CPU 113 sets the number of lines per page as the number of resolution conversion lines N as N=Yi (ST1117) and executes N-line resolution conversion processing (ST1118).

Next, using the resolution conversion scaling factor (M1$x$, M1$y$) of the first image process, the local control CPU 113 obtains the number of output pixels (Xo, Yo) as a value obtained by multiplying the number of input pixels (Xi, Yi) by the resolution conversion scaling factor (M1$x$, M1$y$) as Xo=Xi*M1$x$, Yo=Yi*M1$y$ (ST1119). Next, the local control CPU 113 writes the result information in the result information table 130 of the internal parameter 122 (ST1120).

Furthermore, when the first image process is JBIG encoding (ST1121), the local control CPU 113 sets the JBIG encoding parameter 125 of the internal parameter table 122 in the internal register of the JBIG encoder 107 and then resets an input image size (Xi, Yi) in the input image size register which is the internal register of the JBIG encoder 107; likewise the page memory 1 address (P1A) in the source address register, likewise the page memory 2 address (P2A) in the destination memory address register (ST1122).

Next, the local control CPU 113 sets the number of lines per page as the number of JBIG encoding lines N as N=Yi (ST1123) and executes an N-line JBIG encoding process (ST1124). Then, after the image process ends, the local control CPU 113 writes image processing result information such as an amount of code data in the result information table 130 of the internal parameter table 122 (ST1125).

Then, after any one of the above described image processes ends, the local control CPU 113 confirms the input image size (Xi, Yi) of the next second image process as Xi=Xo, Yi=Yo (ST1126).

Next, when the second image process is rotation (ST1127), the local control CPU 113 sets the rotation parameter 124 of the internal parameter table 122 in the internal register of the rotation section 106, then resets the rotation angle information (R2) of the second image process in the rotation angle register which is the internal register of the rotation section 106; likewise the input image size (Xi, Yi) in the input image size register; likewise the page memory 2 address (P2A) in the source address register; likewise the page memory 1 address (P1A) in the destination memory address register (ST1128). Next, the local control CPU 113 executes a 1-page rotation process (ST1129).

When the rotation angle of the information the second image process is 90 degrees or 270 degrees (ST1130), the local control CPU 113 obtains an output image size (Xo, Yo) by switching round vertical/horizontal size information having an input of an image size (Xi, Yi) as Xo=Yi, Yo=Xi (ST1131) or sets Xo=Xi, Yo=Yi otherwise (ST1132). Next, the local control CPU 113 writes the image processing result information in the result information table 130 of the internal parameter table 122 (ST1133).

Furthermore, when the second image process is resolution conversion (ST1134), the local control CPU 113 sets the resolution conversion parameter 123 of the internal parameter table 122 in the internal register of the resolution conversion section 105, then resets the resolution conversion scaling factor (M2$x$, M2$y$) in the conversion scaling factor register which is an internal register of the resolution conversion section 105 from the resolution conversion scaling factor information of the second image process; likewise the input image size (Xi, Yi) in the input image size register; likewise the page memory 2 address (P2A) in the source address register; likewise the page memory 1 address (P1A) in the destination memory address register (ST1135). Next, the local control CPU 113 sets the number of lines per page as the number of resolution conversion lines N as N=Yi (ST1136) and executes N-line resolution conversion processing (ST1137).

Next, using the resolution conversion scaling factor (M2$x$, M2$y$) of the second image process, the local control CPU 113 obtains the number of output pixels (Xo, Yo) as a value obtained by multiplying the number of input pixels (Xi, Yi) by the resolution conversion scaling factor (M2$x$, M2$y$) as Xo=Xi*M2$x$, Yo=Yi*M2$y$ (ST1138) Next, the local control CPU 113 writes the image processing result information in the result information table 130 of the internal parameter table 122 (ST1139).

Furthermore, when the second image process is JBIG encoding (ST1140), the local control CPU 113 sets the JBIG encoding parameter 125 of the internal parameter table 122 in the internal register of the JBIG encoder 107, then resets the input image size (Xi, Yi) in the input image size register which is an internal register of the JBIG encoder 107; likewise the page memory 2 address (P2A) in the source address register; likewise the page memory 1 address (P1A) in the destination memory address register (ST1141).

Next, the local control CPU 113 sets the number of lines per page as the number of JBIG encoding lines N as N=Yi (ST1142) and executes an N-line JBIG encoding process (ST1143). Then, after the image process ends, the local control CPU 113 writes image processing result information such as an amount of code data in the result information table 130 of the internal parameter table 122 (ST1144).

After any one of the above described image processes ends, the local control CPU 113 confirms the input image size (Xi, Yi) of the next third image process as Xi=Xo, Yi=Yo (ST1145).

Next, when the third image process is rotation (ST1146), the local control CPU 113 sets the rotation parameter 124 of the internal parameter table 122 in the internal register of the rotation section 106, then resets the rotation angle information (R3) of the third image process in the rotation angle register which is an internal register of the rotation section 106; likewise the input image size (Xi, Yi) in the input image size register; likewise the page memory 1 address (P1A) in the source address register; likewise the page memory 2 address (P2A) in the destination memory address register (ST1147). Next, the local control CPU 113 executes a 1-page rotation process (ST1148). When the rotation angle information of the third image process is 90 degrees or 270 degrees (ST1149), the local control CPU 113 obtains the output image size (Xo, Yo) by switching round the vertical/horizontal size information having an input of an image size (Xi, Yi) as Xo=Yi, Yo=Xi (ST1150) or sets Xo=Xi, Yo=Yi otherwise (ST1151). Next, the local control CPU 113 writes the image processing result information in the result information table 130 of the internal parameter table (ST1152).

Furthermore, when the third image process is resolution conversion (ST1153), the local control CPU 113 sets the resolution conversion parameter 123 of the internal parameter table 122 in the internal register of the resolution conversion section 105, then resets the resolution conversion scaling factor (M$3x$, M$3y$) in the conversion scaling factor register which is an internal register of the resolution conversion section 105 from the resolution conversion scaling factor information of the third image process; likewise the input image size (Xi, Yi) in the input image size register; likewise the page memory 1 address (P1A) in the source address register; likewise the page memory 2 address (P2A) in the destination memory address register (ST1154). Next, the local control CPU 113 sets the number of lines per page as the number of resolution conversion lines N as N=Yi (ST1155) and executes an N-line resolution conversion process (ST1156).

Using the resolution conversion scaling factor (M$3x$, M$3y$) of the third image process, the local control CPU 113 obtains the number of output pixels (Xo, Yo) as a number obtained by multiplying the number of input pixels (Xi, Yi) by the resolution conversion scaling factor (M$3x$, M$3y$) as Xo=Xi*M$3x$, Yo=Yi*M$3y$ (ST1157). Next, the local control CPU 113 writes the image processing result information in the result information table 130 of the internal parameter table 122 (ST1158).

Furthermore, when the third image process is JBIG encoding (ST1159), the local control CPU 113 sets the JBIG encoding parameter 125 of the internal parameter table 122 in the internal register of the JBIG encoder 107, then resets the input image size (Xi, Yi) in the input image size register which is an internal register of the JBIG encoder 107; likewise the page memory 1 address (P1A) in the source address register; likewise the page memory 2 address (P2A) in the destination memory address register (ST1160). Next, the local control CPU 113 sets the number of lines per page as the number of JBIG encoding lines N as N=Yi (ST1161) and executes an N-line JBIG encoding process (ST1162).

Then, after the image process ends, the local control CPU 113 writes the image processing result information such as an amount of code data in the result information table 130 of the internal parameter table 122 (ST1163).

Next, the local control CPU 113 causes the DMA controller 108 to carry out a data transfer of the composite processing output data written in the page memory #2 on the SDRAM 110 through the above described composite processing to the external data output section 104 through the bus bridge 109 and image bus 103 and outputs the data to the host image bus 101 (ST1164).

According to the second embodiment of the above described composite processing sub program (ST214), by providing the contents of the decoding processing parameter with an input image size, image processing specification information in the image processing order and control information for changing the output image size such as a variable scaling factor and rotation angle as the image size control information, and carrying out processes of resetting the register in each image processing function block according to the image size control information specified in the image processing order, executing image process, calculating the output image size and using the output image size as the input image size of the next image process sequentially, the output image size changes according to the contents of the image processing parameters such as expansion/compression and rotation and even when the same image process is set a plurality of times, the external host CPU 131 can complete the processes through only a setting of a single command without the need to change the image processing parameter table and shorten the processing time of the external host CPU 131.

As described above, this embodiment eliminates the necessity to have image processing parameters individually according to the image processing parameter table 116 on the parameter memory 115 and the arbitrary combination of image processes as shown in the structure of the internal parameter 122 on the SDRAM 110, and can thereby reduce the number of the image processing parameters, reduce the area occupied by the parameter table on the memory, reduce internal memory resources of the image signal processing apparatus and use those resources efficiently.

Furthermore, using the composite processing parameter 126, it is possible to operate the single image process sub program according to the control procedure of the composite processing, process a plurality of specified image processes successively in an arbitrary combination and in an arbitrary processing order, eliminate the necessity to have the control programs of the local control CPU 113 individually, suppress the amount of programming work, reduce development man-hours, reduce the amount of μ program data and reduce the necessary capacity of the ROM μ program 127.

As detailed above, the present invention can perform image processes in an arbitrary combination of a plurality of image processing function blocks and in an arbitrary processing order and process images using a single command even when images in varying output image sizes are combined.

The image signal processing apparatus preferably comprises a plurality of image processing function blocks, an individual image processing parameter table which determines the contents of individual operations for each image processing function block, a composite processing parameter table which determines the processing order of the image processing function blocks and operates the image processing function blocks in the image processing order of the composite processing parameter table according to the individual operation contents of the individual image processing parameter table sequentially.

This eliminates the necessity to individually have image processing parameters according to the condition of a combination of arbitrary image processes, can thereby reduce the number of image processing parameters, reduce the area of occupation of the parameter table on the memory, reduce internal memory resources of the image signal processing apparatus and use the resources efficiently.

Furthermore, when an individual image processing command is issued, it is preferable to execute individual image processes using the corresponding individual processing parameter table and image processing function block, and when a composite processing command is issued, operate the image processing function blocks in the order according to the setting of the composite processing parameters according to the contents of the individual processing parameter table.

This eliminates the necessity to have μ programs individually and can suppress the amount of programming work and amount of μ program data according to an arbitrary combination of image processes and an arbitrary processing order.

Furthermore, when a composite processing command is issued, it is preferable for the external host CPU to copy a directly readable/writable individual processing parameter table and the contents of the composite processing parameter table to the internal parameter table and operate the image processing function blocks according to the contents of the individual processing parameter table of the internal parameter table in the order according to the image processing order information of the composite processing parameter of the internal parameter table.

After a composite processing command is issued, the external host CPU can change the contents of the individual processing parameter table and composite processing parameter table at any time without waiting for the command to end and thereby shorten the total image processing time including the parameter setting time of the external host CPU.

Furthermore, the composite processing parameter table includes the input image size and control information for changing the output image size such as a variable scaling factor and rotation angle as the image size control information and when a composite processing command is issued, it is preferable to calculate and change the individual processing parameter table information copied to the internal parameter table from the image processing order information of the composite processing parameter table copied to the internal parameter table and input image size and image size control information.

In this way, even when the output image size changes according to the contents of the image processing parameters such as expansion/compression and rotation, the external host CPU need not to change the input/output image size value of the individual image processing parameter table, can complete the processing through only a single command setting and shorten the processing time of the external host CPU.

Furthermore, the composite processing parameter table includes the input image size and control information for changing the output image size such as a variable scaling factor and rotation angle as image processing specification information and image size control information in the image processing order, and when a composite processing command is issued, the corresponding individual processing parameter table is set in the image processing function block first as the first image process according to the image processing specification information in the order of image processes of the decoding processing parameter table copied to the internal parameter table, then the input image size and the contents according to the image size control information are set in the image processing function blocks, the output image size is calculated from the input image size and image size control information, the image process is executed and the first image process ends. Then, as the second image process, the same process as the first image process is repeatedly executed using the output image size as the input image size.

This causes the output image size to be changed according to the contents of the image processing parameters of expansion/compression, rotation, etc., and even if the same image process is set a plurality of times, the external host CPU need not change the input/output image size values of the individual image processing parameter table, can complete the processing through only a single command setting and shorten the image processing time of the external host CPU.

Furthermore, it is preferable to input image data in line units until a page input end command is issued, count the number of lines and determine the input image size obtained from the line count when the page input end command is issued.

This allows the external host CPU to input image data even if the number of lines per page is not confirmed without waiting for the number of lines to be confirmed and can shorten the image processing time including the data input processing time.

Furthermore, it is also preferable to include the function of writing the result information of the successive operations of the image processing function blocks in the result information table of the internal parameters sequentially and after all image processes end, write back only the result information table of the internal parameters in the image processing parameter result information table.

After the issuance of a command, this allows the external host CPU to obtain the effects of being able to change the contents of the individual processing parameter table and composite processing parameter table at any time without waiting for the command to end and at the same time read the image processing result information such as output data size, amount of output code data and image processing errors.

Furthermore, it is preferable to copy the internal parameter table on the same memory as the page memory.

This makes it possible to construct an image signal processing apparatus without requiring any additional memory for the internal parameter table.

Furthermore, the composite processing parameter includes page memory address information and when a composite processing command is issued, it is preferable to change the image data source address and destination address of the individual processing parameter table copied to the internal parameter table from the processing order information of the image processing function blocks and the page memory address information.

In this way, even if the image processing order of the composite processing is changed, the start address of the page memory on the SDRAM 110 is fixed according to the processing order and it is possible to perform image processes using a page memory with two pages even if the number of times composite processing is carried out increases and thereby use the memory space effectively.

Furthermore, the composite processing parameter table includes page memory address information, and when a composite processing command is issued, it is preferable to set the corresponding individual processing parameter table in the image processing function block register as the first image process in the order according to the processing order information of the image processing function blocks first, then set the source address register and destination address register of the image data of the image processing function blocks from the processing order information of the image processing function blocks and page memory address information, execute image processes and repeat the same processes from the second image process onward.

In this way, even when the image processing order of the composite processing changes and the same image process is specified a plurality of times, the start address of the page memory on the SDRAM 110 is fixed according to the processing order, and therefore it is possible to carry out image processes with a page memory having two pages even if the number of times the composite processing is carried out increases and thereby use the SDRAM memory effectively.

Furthermore, it is preferable to designate the internal parameter area to which the internal parameter table is copied as an area inaccessible to the external host CPU.

This allows the host CPU to directly access the image data on the SDRAM 110, and when additional images such as header or footer is added to the image data or when the header information is rewritten over the code data, it is possible to prevent the internal parameters from being rewritten due to wrong control of the host CPU or prevent the composite processing from failing to function normally as a result.

Furthermore, it is also preferable to include a section for checking the destination address value and page memory address value of the image data in the table after the internal parameter table is copied and when the address value is other than the data area specified beforehand, decide that there is a parameter error, not execute the specified image process and end the specification command.

When the host CPU sets wrong addresses as the destination address values of the individual processing parameters and page memory address values of the composite processing parameters, it is possible to prevent the internal parameters from being overwritten due to a data transfer and prevent the composite processing from failing to function normally as a result.

Figure 18:
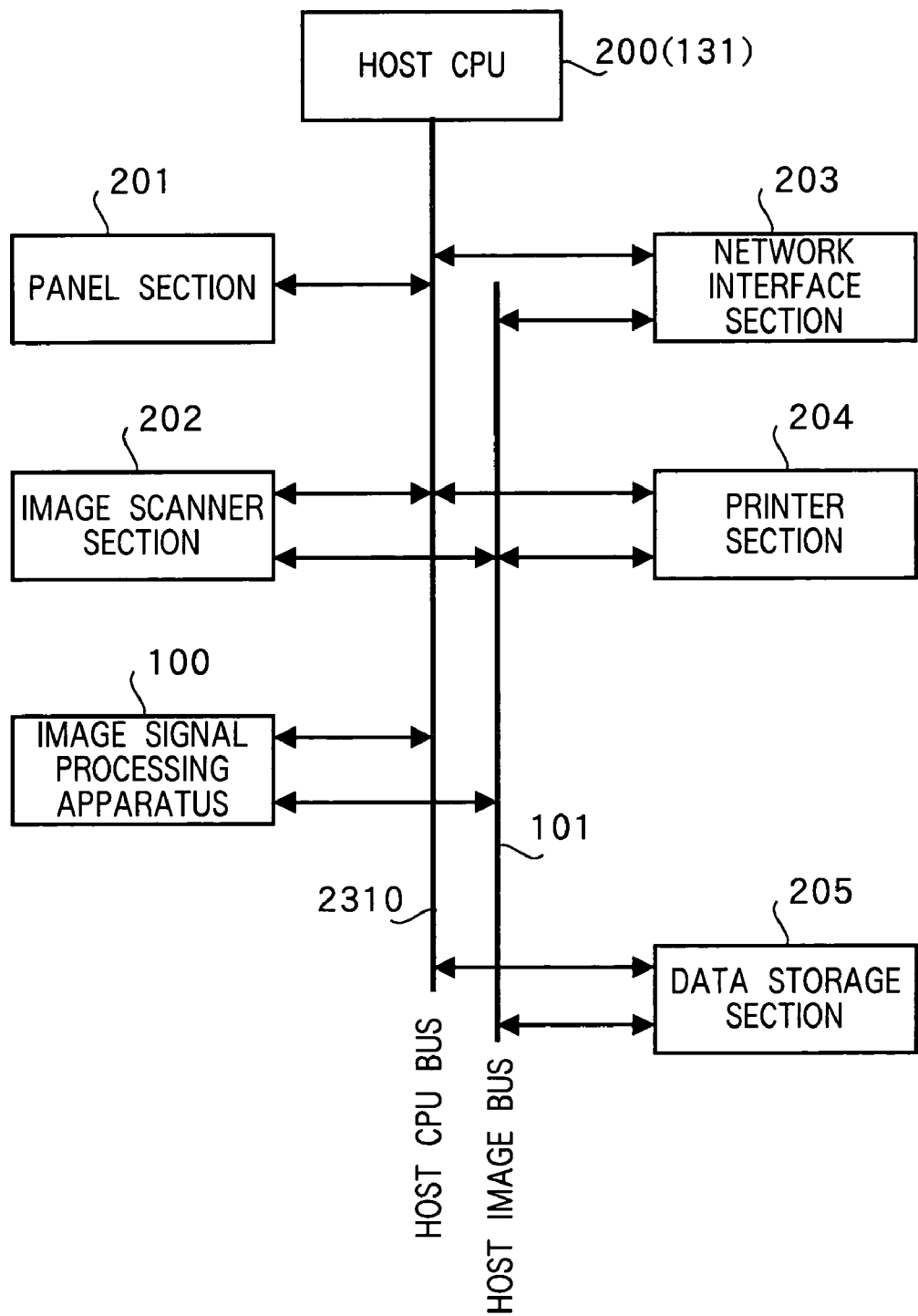
FIG. 18 illustrates function blocks of a digital multi function machine to which the image signal processing apparatus according to this embodiment is applied.

FIG. 18 is function blocks of a digital multi function machine to which the above described image signal processing apparatus 100 is applied.

The digital multi function machine is provided with a panel section 201 for the user to set the functions and operation start of the digital multi function machine and a host CPU 200 that sets the functions of various function modules and controls their operations according to the settings of the panel section 201. The host CPU 200 is the external host CPU 131 in FIG. 1.

The digital multi function machine is further provided with an image scanner section 202 that reads image data, a network interface section 203 for inputting/outputting data to/from a network, a data storage section 205 and a printer section 204 for printing images.

The image signal processing apparatus 100 carries out image signal processing such as resolution conversion, rotation, encoding, decoding on the image data scanned by the image scanner section 202 and the image data specified by the host CPU 200.

When the setting of the aforementioned panel section 201 is set to a network scanner mode, the host CPU 200 carries out encoding using the image signal processing apparatus 100, stores the encoded data in the data storage section 205, then outputs the data to the network via the network interface section 203.

On the other hand, when the panel section 201 is set to a copy mode, the host CPU 200 carries out image processes set by the panel section 201 at the image signal processing apparatus 100, stores the data in the data storage section 205 and then sends the stored image data to the printer section 204 to print the data.

The present invention is not limited to the above described embodiments, and various variations and modifications may be possible without departing from the scope of the present invention.

This application is based on the Japanese Patent Application No. 2004-269025 filed on Sep. 15, 2004, entire content of which is expressly incorporated by reference herein.

What is claimed is:

1. An image signal processing apparatus comprising:
   a plurality of image processing function blocks;
   a plurality of individual image processing parameter tables in which individual image processing parameters specifying the contents of individual operations are set for each of said plurality of image processing function blocks;
   a composite processing parameter table in which composite processing parameters specifying a processing order of said plurality of image processing function blocks are set; and
   a local control CPU that operates corresponding image processing function blocks successively in the processing order specified in said composite processing parameters and according to the contents of respective individual operations specified in the individual image processing parameters for respective image processing function blocks to be operated,
   wherein when an individual image processing command is issued, one image processing function block to be operated is operated according to the contents of the individual operations specified in the individual image processing parameters for said image processing function blocks, and when a composite processing command is issued, the plurality of image processing function blocks to be operated are operated successively in the processing order specified in the composite processing parameters, and
   wherein when a composite processing command is issued, the contents of said individual processing parameter table that is directly readable/writable by an external host CPU and said composite processing parameter table are copied to an internal parameter table, the operation order of the plurality of image processing function blocks to be operated is controlled with reference to the composite processing parameters copied to said internal parameter table as image processing order information and the image processing function blocks to be operated are operated with reference to the individual image processing parameters copied to said internal parameter table.

2. The image signal processing apparatus according to claim 1, wherein the composite processing parameters set in said composite processing parameter table include an input image size and image size control information for changing an output image size including at least a variable scaling factor and a rotation angle, and
   when a composite processing command is issued, said individual image processing parameters copied to said internal parameter table are recalculated and changed using said image processing order information in the composite processing parameters copied to said internal parameter table, including said input image size and said image size control information.

3. The image signal processing apparatus according to claim 1, wherein the composite processing parameters set in said composite processing parameter table include an input image size, image processing specification information specified for each image processing order, and image size control information specified for each image processing order including at least a variable scaling factor and a rotation angle for changing an output image size, and
   when a composite processing command is issued, the corresponding individual image processing parameters are set in an image processing function block as a first image process with reference to the composite processing parameters copied to said internal parameter table according to the image processing specification information for each image processing order first, then control contents according to said input image size and image size control information are set in the image processing function block, an output image size is calculated from said input image size and image size control information, an image process is executed to terminate the first image process, and then the same process as the first image process is repeatedly executed as the second image process using said output image size as the input image size.

4. The image signal processing apparatus according to claim 1, wherein image data is input in line units until a page input end command is issued, a number of lines is counted and the input image size obtained from a line count when the page input end command is issued is used.

5. The image signal processing apparatus according to claim 1, wherein result information on the sequential operation of the image processing function blocks is written successively in a result information table in the internal parameter table and after all image processes are completed, only the result information table in said internal parameter table is written back into the result information table of image processing parameters.

6. The image signal processing apparatus according to claim 1, wherein said internal parameter table is copied to a page memory.

7. The image signal processing apparatus according to claim 6, wherein an internal parameter area to which the internal parameter table is copied is designated as an area inaccessible to the external host CPU.

8. The image signal processing apparatus according to claim 6, wherein after the internal parameter table is copied, a source address and a destination address value of the image data in the internal parameter table and page memory address value are checked, and when said address value is anything other than the data area specified beforehand, it is decided that there is a parameter error and the specification command is terminated without executing the specified image process.

9. The image signal processing apparatus according to claim 1, wherein the composite processing parameters stored in said composite processing parameter table include page memory address information, and when a composite processing command is issued, an image data source address and a destination address of the individual image processing parameter table copied to the internal parameter table are changed from the processing order information of the image processing function blocks and said page memory address information.

10. The image signal processing apparatus according to claim 1, wherein the composite processing parameters stored in said composite processing parameter table include page memory address information, and when a composite processing command is issued, the corresponding individual image processing parameter table is set in an image processing function block register as a first image process in an order according to processing order information of the image processing function blocks, a source address register and a destination address register of the image data of the image processing function blocks are set from the processing order information of the image processing function blocks and page memory address information, image processes are executed and the same process is repeated from the second image process onward.

11. A digital multi function machine comprising the image signal processing apparatus according to claim 1, and a printer that prints image data output from said image signal processing apparatus.

* * * * *